(12) United States Patent
Nelson et al.

(10) Patent No.: US 11,544,653 B2
(45) Date of Patent: Jan. 3, 2023

(54) SYSTEM AND METHOD FOR IMPROVING PRODUCT CATALOG REPRESENTATIONS BASED ON PRODUCT CATALOG ADHERENCE SCORES

(71) Applicant: Overstock.com, Inc., Midvale, UT (US)

(72) Inventors: Scott Douglas Nelson, West Jordan, UT (US); Jacob William Harms, Sandy, UT (US); Martha Marie Tinker, Salt Lake City, UT (US); Paul J. Kersey, Eagle Mountain, UT (US); Steven Lee Trousdale, Tooele, UT (US); Steven Brad Jeppesen, South Jordan, UT (US); Mark Alan Baker, Sandy, UT (US); Cory Richard Hash, Riverton, UT (US); Anil Waddi, Midvale, UT (US)

(73) Assignee: Overstock.com, Inc., Midvale, UT (US)

( * ) Notice: Subject to any disclaimer, the term of this patent is extended or adjusted under 35 U.S.C. 154(b) by 45 days.

(21) Appl. No.: 16/910,787

(22) Filed: Jun. 24, 2020

(65) Prior Publication Data

US 2020/0401976 A1 Dec. 24, 2020

Related U.S. Application Data

(60) Provisional application No. 62/865,775, filed on Jun. 24, 2019.

(51) Int. Cl.
*G06Q 10/06* (2012.01)
*G06Q 30/06* (2012.01)
(Continued)

(52) U.S. Cl.
CPC .......... *G06Q 10/06375* (2013.01); *G06Q 10/06315* (2013.01); *G06Q 10/087* (2013.01);
(Continued)

(58) Field of Classification Search
CPC .......... G06Q 30/0206; G06Q 30/0201; G06Q 30/0244; G06Q 30/0283; G06Q 10/06393; G06Q 10/067
See application file for complete search history.

(56) References Cited

U.S. PATENT DOCUMENTS 7,133,882 B1 * 11/2006 Pringle .................. G06Q 30/06
7,624,173 B2 * 11/2009 Bary ..................... G06F 16/958
709/224

(Continued)

OTHER PUBLICATIONS

PeopleSoft FSCM 9.2: Catalog Management Oracle, Mar. 2013 (Year: 2013).*

(Continued)

*Primary Examiner* — Scott L Jarrett
(74) *Attorney, Agent, or Firm* — Fogg & Powers LLC

(57) ABSTRACT

A computing system includes: processor(s), memory(s), storage device(s), and network interface(s) configured to communicate with data source(s) and remotely located computing device(s). The network interface(s) receives data regarding a digital product catalog representation of products from the data source(s). The processor(s): generates a respective score for the digital product catalog representation for each respective product, the score indicative of adherence of the digital product catalog representation for each respective product to at least one criterion; stores the respective score for the digital product catalog representation for each respective product using the at least one storage device; and identifies which products provide the greatest opportunity for sales improvement by improving adherence of the digital product catalog representation to the at least (Continued)

one criterion. The network interface(s) provides an indication of which products provide the greatest opportunity for sales improvement to the at least one remotely located computing device.

14 Claims, 9 Drawing Sheets

(51) Int. Cl.
    *G06Q 30/02*     (2012.01)
    *G06Q 10/08*     (2012.01)
    *G06Q 10/10*     (2012.01)
    *G06Q 10/04*     (2012.01)

(52) U.S. Cl.
    CPC ..... *G06Q 30/0282* (2013.01); *G06Q 30/0603* (2013.01); *G06Q 10/04* (2013.01); *G06Q 10/10* (2013.01); *G06Q 30/0201* (2013.01)

(56) References Cited

U.S. PATENT DOCUMENTS

| | | | |
|---|---|---|---|
| 7,873,529 B2* | 1/2011 | Kruger | G06Q 30/0204 705/7.11 |
| 8,447,751 B2* | 5/2013 | Stouffer | G06F 16/951 707/709 |
| 8,458,054 B1* | 6/2013 | Thakur | G06Q 30/0603 705/27.1 |
| 9,489,470 B1* | 11/2016 | Feinleib | G06F 16/958 |
| 9,552,600 B1* | 1/2017 | Goldberg | G06Q 10/063114 |
| 10,262,348 B2* | 4/2019 | Le Stunff | G06F 16/285 |
| 10,387,526 B2* | 8/2019 | Jones | G06F 16/958 |
| 10,438,264 B1* | 10/2019 | Viswanathan | G06F 16/951 |
| 10,580,021 B2* | 3/2020 | Bagwell | G06Q 10/087 |
| 10,810,654 B1 | 10/2020 | Robertson et al. | |
| 10,860,594 B2* | 12/2020 | Jamshidi | G06F 16/986 |
| 10,937,033 B1* | 3/2021 | Rodriguez | G06N 20/00 |
| 10,970,463 B2 | 4/2021 | Noursalehi et al. | |
| 11,062,365 B2* | 7/2021 | Siddiqui | G06Q 30/0603 |
| 11,238,507 B2* | 2/2022 | Nagar | G06V 10/40 |
| 11,244,366 B2* | 2/2022 | Le Stunff | G06F 16/285 |
| 2006/0217989 A1* | 9/2006 | Smith | G06Q 10/06393 715/206 |
| 2006/0253345 A1* | 11/2006 | Heber | G06Q 10/06395 705/26.1 |
| 2007/0073599 A1* | 3/2007 | Perry | G06Q 30/02 705/26.5 |
| 2008/0133500 A1* | 6/2008 | Edwards | G06F 16/24578 |
| 2009/0012881 A1 | 1/2009 | Popelka et al. | |
| 2010/0262601 A1* | 10/2010 | Dumon | G06Q 30/0603 707/727 |
| 2011/0320395 A1* | 12/2011 | Dada | G06Q 30/02 706/47 |
| 2012/0010927 A1* | 1/2012 | Attenberg | G06Q 30/0241 705/14.4 |
| 2012/0041938 A1* | 2/2012 | Yu | G06Q 30/0251 707/709 |
| 2012/0254723 A1* | 10/2012 | Kasa | G06F 40/221 715/234 |
| 2012/0290446 A1* | 11/2012 | England | G06Q 30/0282 705/27.1 |
| 2013/0041779 A1 | 2/2013 | Byrne | |
| 2013/0159056 A1* | 6/2013 | Doig | G06Q 30/0623 705/7.32 |
| 2015/0039746 A1* | 2/2015 | Mukherjee | H04L 41/5067 709/224 |
| 2015/0356658 A1* | 12/2015 | Morris | G06Q 10/06393 705/26.7 |
| 2017/0017969 A1 | 1/2017 | Noursalehi et al. | |
| 2017/0236174 A1* | 8/2017 | Aggarwal | G06Q 30/0282 705/26.35 |
| 2017/0323357 A1* | 11/2017 | Le Stunff | G06Q 30/0603 |
| 2017/0372407 A1* | 12/2017 | Konigsberg | G06Q 30/0641 |
| 2018/0121977 A1* | 5/2018 | Yang | G06F 16/2365 |
| 2018/0121979 A1* | 5/2018 | Yang | G06Q 30/0603 |
| 2018/0276726 A1* | 9/2018 | Siddiqui | G06Q 30/0603 |
| 2018/0308159 A1* | 10/2018 | Knijnik | G06N 5/04 |
| 2019/0164449 A1* | 5/2019 | Kems | G06K 9/6202 |
| 2020/0097985 A1* | 3/2020 | Borar | G06Q 30/0201 |
| 2020/0193493 A1* | 6/2020 | Nagar | G06K 9/6217 |
| 2020/0286147 A1* | 9/2020 | Gudupally | G06F 16/285 |
| 2020/0401976 A1 | 12/2020 | Nelson et al. | |
| 2021/0326968 A1 | 10/2021 | Byrne et al. | |

OTHER PUBLICATIONS

Rusu, Maria Zharia, Vendor Catalogs in Dynamics AX Microsoft, May 25, 2016 (Year: 2016).*

* cited by examiner

SYSTEM AND METHOD FOR IMPROVING PRODUCT CATALOG REPRESENTATIONS BASED ON PRODUCT CATALOG ADHERENCE SCORES

CROSS-REFERENCE TO RELATED APPLICATIONS

This application claims the benefit of U.S. Provisional Patent Application Ser. No. 62/865,775 filed on Jun. 24, 2019, entitled "SYSTEM AND METHOD FOR PRODUCT CATALOG SCORING, ADVISING, AND IMPROVING", the entirety of which is incorporated herein by reference.

BACKGROUND

Products can be sold online, such as through online marketplaces.

SUMMARY

A computing system includes processor(s), memory(s), storage device(s), and network interface(s) configured to communicate with data source(s) and remotely located computing device(s). The network interface(s) receives data regarding a digital product catalog representation of products from the data source(s). The processor(s): generates a respective score for the digital product catalog representation for each respective product, the score indicative of adherence of the digital product catalog representation for each respective product to at least one criterion; stores the respective score for the digital product catalog representation for each respective product using the at least one storage device; and identifies which products provide the greatest opportunity for sales improvement by improving adherence of the digital product catalog representation to the at least one criterion. The network interface(s) provides an indication of which products provide the greatest opportunity for sales improvement to the at least one remotely located computing device.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
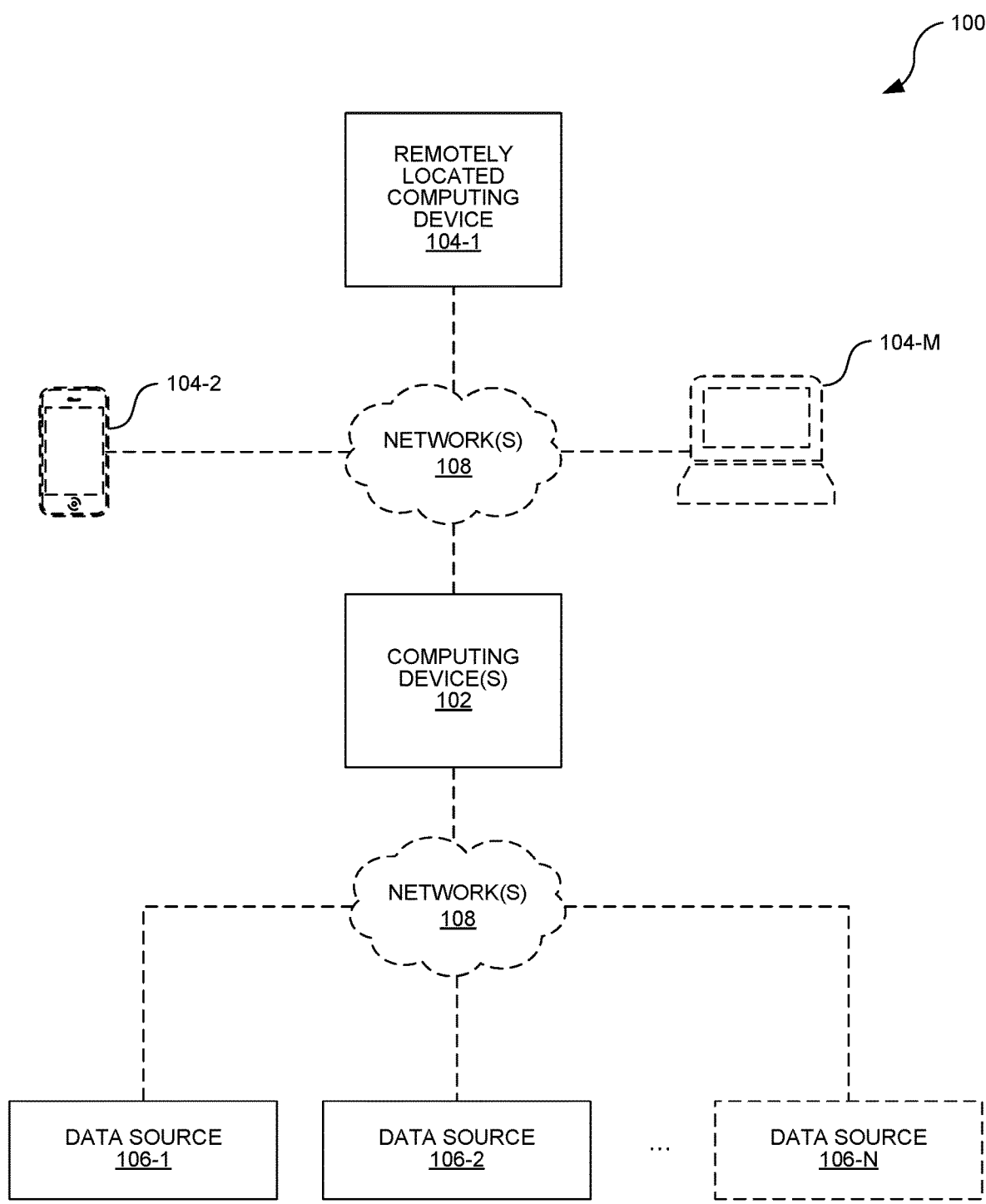
FIG. 1 is a block diagram illustrating an example system for product catalog scoring, advising, and improving.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

In examples, retailer and manufacturer partners sell products through online marketplaces, such as Overstock.com®. When provided a product scorecard gauging the "optimization" of products, retailer and manufacturer partners are often willing to adapt their business practices to a new set of best practice guidelines. In an experiment, one company's 100 best-performing products were improved according to the standard over a 30 day period, resulting in a 20 basis point (0.2%) increase in conversion/sales where 50% of the sample products saw significantly greater sales than the previous 30-day period, accounting for seasonality and other retail variables.

Through market research, a series of best-practice standards were developed pertaining to important conditions related to partner retail product management and processing. Based on these standards, an objective scoring methodology was derived indicating areas in which a partner will see marked improvement in sales performance for products optimized to meet the standards. Traditionally, performance metrics are presented through detailed reporting applications which are then exported to spreadsheets to be used as a source for interpretation by sourcing analysts in determining follow-up actions to be taken. This manual process has created a dependency for retail partners to rely too heavily on data analysts provided by online marketplaces (such as Overstock.com®) for guidance in running and improving their business.

The systems and methodologies described herein (such as the Opportunity Compass platform created by Overstock. com®) directs partners, through a digital interface in a product catalog management platform (such as the Supplier Oasis platform) to optimize product details and supply chain processes without the need for manual data analysis. In examples, the system identifies which products provide the greatest opportunity for sales improvement, communicates the criteria that is impeding sales performance, and links directly to the system application so the partner can quickly and easily correct the problem to improve sales.

In examples, the systems and methodologies described herein empowers partners to improve their own business performance by presenting them a self-service, actionable checklist that provides clear, easy-to-understand business improvement recommendations. The product changes partner behavior to follow established best practices in improving conversion of partners' highest-opportunity SKUs.

Thus, the present systems and methodologies may improve the fields of online retail analytics and online retail catalog management by empowering a user to easily (1) identify (in a single digital interface) product(s) with digital product representation(s) that, if changed in recommended area(s), would sell more; and (2) make changes to the digital product representation(s) of the identified product(s) using link(s) specific for the product. By identifying and changing digital product representation(s) using the present systems and methodologies, a business owner can boost their sales with minimal effort compared to conventional approaches. In other words, the present systems and methodologies enables easy viewing and manipulation of data representing products sold in an online retail platform in ways that increase sales (as supported by historical market research).

FIG. 1 is a block diagram illustrating an example system for product catalog scoring, advising, and improving. In examples, the system 100 includes computing device(s) 102, remotely located computing device(s) 104 (including remotely located computing device 104-1 and any quantity of optional remotely located computing devices 104 through optional remotely located computing device 104-M), and data sources 106 (including data source 106-1 and data source 106-2 and any quantity of optional data sources 106 through optional data source 106-N). In examples, the computing device(s) 102 are communicatively coupled to the remotely located computing device(s) 104 and data sources 106 through at least one network 108. In examples, data can be communicated between the computing device(s) 102, the remotely located computing device(s) 104, and the data sources 106 by shuttling data using a mobile storage device, such as a USB drive, or by other suitable means. The system may include more than one of the various devices.

Each of the computing device(s) 102, the remotely located computing device(s) 104, the data sources 106, and any other computing devices may be implemented as any of a mobile computing device, such as a mobile phone, tablet computer, mobile media device, mobile gaming device, laptop computer, or vehicle-based computer, etc.; or a non-mobile computing device such as a dedicated terminal, a public terminal, a kiosk, a server, a cloud server, or a desktop computer. In examples, each of the computing device(s) 102, the remotely located computing device(s) 104, the data sources 106, and any other computing devices may include at least one memory, at least one processor, at least one optional network interface, at least one optional display device, at least one optional input device, and at least one optional power source. Additionally, each of the computing device(s) 102, the remotely located computing device(s) 104, the data sources 106, and any other computing devices may be implemented using multiple physical devices.

As used herein, unless otherwise specified, the term "user" (or "customer") refers to a person (or automated instructions, e.g., a script) that accesses the computing device(s) 102 to initiate any of the functionality described herein.

In examples, the remotely located computing device(s) 104 connect to a web portal or other application hosted by the computing device(s) 102. In examples, the remotely located computing device(s) 104 runs an application that receives data from the computing device(s) 102. In examples, the application may present a user interface on the remotely located computing device(s) 104, and the customer may provide input using the user interface. Based at least in part on the user input, the application on the remotely located computing device(s) 104 may send and receive instructions and/or other data to the computing device(s) 102. In examples, the application executing and/or being accessed by the remotely located computing device(s) 104 may only communicate directly with the computing device(s) 102, which communicates with the data sources 106. Alternatively, the application executing and/or being accessed by the remotely located computing device(s) 104 may communicate directly with the data sources 106 and/or other devices in the system 100.

Each of the devices in the system 100 may be communicatively coupled to one or more other devices using at least one network 108. In examples, the at least one network 108 includes at least one wired network and/or at least one wireless network. In examples, any combination of wired and wireless networks may be used to couple the computing device(s) 102, the remotely located computing device(s) 104, and the data sources 106 to each other. In examples, the at least one network 108 includes at least one of at least one local area network (LAN), at least one wide area network (WAN), or the Internet. In examples, any combination of local area networks, wide area networks, or the Internet may be used as the at least one network 108 to couple the computing device(s) 102, the remotely located computing device(s) 104 to each other. In other embodiments, the data sources 106 can also be connected to the remotely located computing device(s) 104 and/or the computing device(s) 102 through the at least one network 108. In examples, the computing device(s) 102 includes a network interface (such as network interface 606) for communicating with remotely located computing device(s) 104 across the network 108.

In examples, a remotely located computing device 104 communicates with the computing device(s) 102 to request data and analysis regarding digital product catalog representations of products being sold at an online marketplace. In examples, the computing device(s) 102 receive (either prior to or after a request from the remotely located computing device 104 for data and analysis) data regarding the digital product catalog representations of products being sold at an online marketplace from the data sources 106. In examples, the computing device(s) 102 generate (either prior to or after a request from the remotely located computing device 104 for data and analysis) a respective score for each respective product of the plurality of products, the score indicative of adherence of the digital product catalog representation for each respective product of the plurality of products to at least one criterion. In examples, the computing device(s) 102 store (either prior to or after a request from the remotely located computing device 104 for data and analysis) the respective score for the digital product catalog representation for each respective product using at least one storage device. In examples, the computing device(s) 102 identify (either prior to or after a request from the remotely located computing device 104 for data and analysis) which products provide the greatest opportunity for sales improvement by improving adherence of the digital product catalog representation to the at least one criterion. In examples, the computing device(s) 102 provide an indication of which products provide the greatest opportunity for sales improvement to the remotely located computing device 104. In examples, the computing device(s) 102 also enable direct links to relevant system application(s) where the user can correct problems resulting in a lower score to improve sales.

Figure 2A:
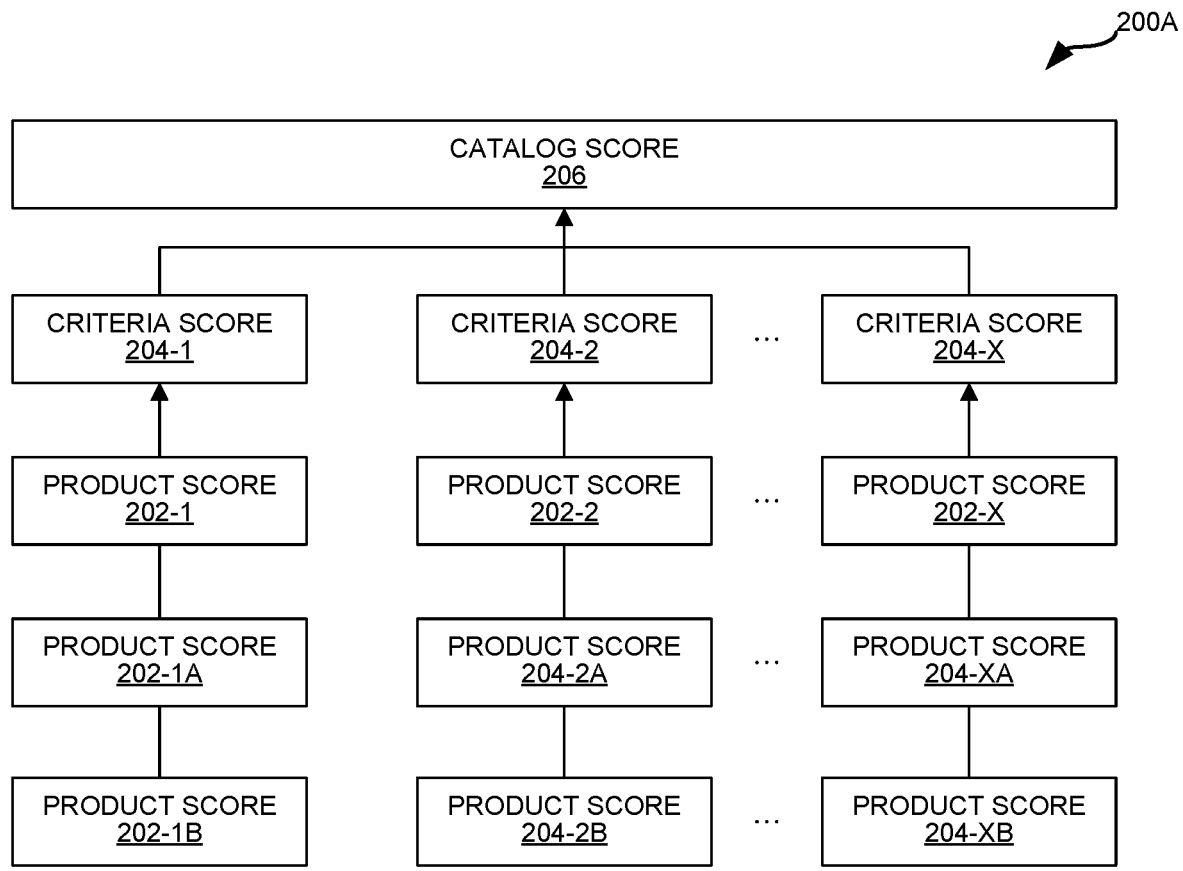
FIG. 2A is a block diagram illustrating an exemplary scoring methodology for scoring products within a product catalog.

FIG. 2A is a block diagram illustrating an exemplary scoring methodology 200A. In examples, the scoring methodology is hierarchical and derived from the best-practice retail standards. In example embodiments, a product score 202 is calculated for various products. In example embodiments, the product score is a numerical value from 0 to 100 indicating the adherence of the product to a specific standard criterion. In examples, a criteria score 204 is a numerical value from 0 to 100 that represents the aggregate (e.g., average, weighted average, mean, etc.) of all product scores 202 as they adhere to the specified standard criterion. In examples, a catalog score 206 is a numerical value from 0 to 100 that represents the aggregate (e.g., average, weighted average, mean, etc.) of all product scores 202 within a high-opportunity subset of the product catalog as they adhere to all best-practice standard criteria.

Figure 2B:
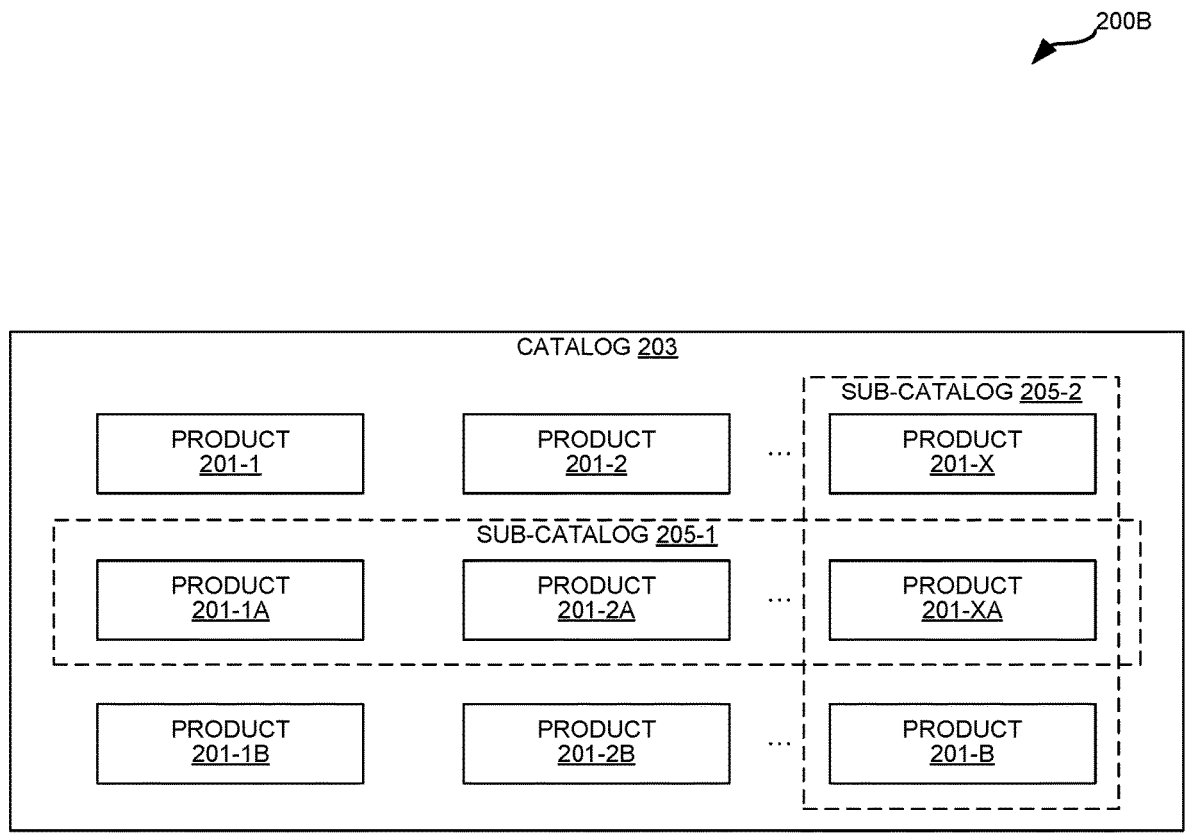
FIG. 2B is a block diagram illustrating exemplary groupings of products sold by a retailer on an online marketplace.

FIG. 2B is a block diagram illustrating exemplary groupings 200B of products 201 sold by a retailer on an online marketplace, such as Overstock.com®. Generally, each product 201 will have an associated stock keeping unit (SKU), e.g., a scannable bar code printed on the product's packaging. A retailer's catalog 203 is a collection of all of the retailer's products 201 eligible to sell on the online marketplace. In some examples, a SKU (product 201) must meet the following qualifications to be included in a retailer's catalog 203: be sourceable by the retailer; have a status where the SKU could become sellable (i.e., not discontinued); and contain no duplicate, corrupt, or otherwise unexpected values that would produce unexpected results for inter-application connectivity.

Further, products 201 in a catalog 203 may belong to one or more sub-catalogs 205. A sub-catalog 205 is a collection of one or more products 201 within a single catalog 203 that can be commonly characterized in some way. In some examples, some sub-catalogs 205 in a catalog 203 may overlap, where a particular product (e.g., product 201-XA) can belong to multiple sub-catalogs 205. In other examples, sub-catalogs 205 don't overlap, in which case a particular product (e.g., product 201-XA) can belong to one sub-catalog 205, at most. Additionally, some products 201 in a catalog 203 might not belong to any sub-catalogs 205.

It should be noted that catalogs 203 and sub-catalogs 205 are distinct from categories and subcategories as discussed herein. In examples, a catalog 203 and its sub-catalogs 205 are specific to a retailer, while a category and its subcategories can include products 201 sold by multiple (e.g., many) retailers selling on a marketplace. As one example, a category may be "furniture" and a subcategory may be "tables", where both the category and subcategory include products 201 sold by multiple retailers. In examples, a particular product 201 can belong to more than one category and/or subcategory. Additionally, some products 201 may not belong to any categories and/or subcategories.

In examples, one sub-catalog 205 (Selling SKUs) may include all products 201 in a particular retailer's catalog 203 that have been purchased on the online marketplace by any customer within a previous window of time, e.g., the previous 30 days, 60 days, 90 days, 180 days, etc.

In examples, another sub-catalog 205 (Seasonal SKUs) may include products 201 in a particular retailer's catalog 203 whose subcategory is considered to be seasonal, e.g., belonging to a subcategory with products 201 projected to meet certain sales metrics during a particular window of time (e.g., beginning within the next 30 days, 60 days, 90 days, 180 days, etc.) based on historical sales data for similar products 201. In some examples, all product subcategories may be assigned a seasonality (e.g., based on a seasonality threshold) regardless of whether products are considered, in general retail practice, to be "seasonal" products. In some examples, there may be multiple Seasonal SKU sub-catalogs 205 for a particular retailer, e.g., with a sales period beginning in the next period of time (e.g., 30 days, 60 days, 90 days, 180 days, etc.). Seasonal periods may be defined according to the following Table 1 below:

TABLE 1

Season SKU Promotion Schedule
Season SKU Promotion Schedule

| Season | Winter | | Spring | | Summer | | Fall | | Holiday | |
|---|---|---|---|---|---|---|---|---|---|---|
| Seasonality Threshold | Jan | Feb | Mar | Apr | May | Jun | Jul | Aug | Sep | Oct | Nov | Dec |
| Subcategory (SKUs Displayed) | | Spring SKUs | | | Summer SKUs | | | Fall SKUs | | Holiday SKUs | | Winter SKUs | where a particular subcategory of products 201 have historically and/or are projected to meet (or exceed) certain seasonality sales thresholds during a first set of months and are mostly or entirely displayed during a second set of months (where the first set of months and the second set of months may overlap or not).

In examples, sales for each subcategory are segmented as a portion of annual sales and a seasonal threshold is determined (using one and two standard deviations from the mean) to convey the seasons in which each subcategory is considered seasonal. The seasonality indicator (seasonal/not seasonal for each season) may be defined for each subcategory. In examples, a subcategory of products 201 is considered "seasonal" when sales for the products in a given season is greater than or equal to one standard deviation above the mean of annualized sales over the past X days, weeks, months, or years, e.g., 24 months. In Table 1, entries in the season row, seasonality threshold row, and sub-catalog row correspond based on their typeface (bold; underlined; bold and underlined; regular; and italicized underlined).

With reference to Table 1, a Spring SKUs subcategory may include products 201 that are mostly or entirely displayed during January through March and have historically and/or are projected to meet certain seasonality sales thresholds in March through May (underlined typeface). In other words, products 201 in the Spring subcategory (Spring SKUs) have historically and/or are projected to sell at least one standard deviation above annualized sales in March, April, and May over the last X days, weeks, months, or years.

In examples, a Summer SKUs subcategory may include products that are displayed during April through June and have historically and/or are projected to meet certain seasonality sales thresholds in June through August (bold underlined typeface). In other words, products 201 in the Spring subcategory (Spring SKUs) have historically and/or are projected to sell at least one standard deviation above annualized sales in April, May, and June over the last X days, weeks, months, or years, e.g., 24 months.

In examples, a Fall SKUs subcategory may include products 201 that are mostly or entirely displayed during July through August and have historically and/or are projected to meet certain seasonality sales thresholds in September through October (regular typeface). In other words, products 201 in the Fall subcategory (Fall SKUs) have historically and/or are projected to sell at least one standard deviation above annualized sales in July and August over the last X days, weeks, months, or years, e.g., 24 months.

In examples, a Holiday SKUs subcategory may include products 201 that are mostly or entirely displayed during September through October and have historically and/or are projected to meet certain seasonality sales thresholds in November through December (italicized underlined typeface). In other words, products 201 in the Holiday subcategory (Holiday SKUs) have historically and/or are projected to sell at least one standard deviation above annualized sales in September and October over the last X days, weeks, months, or years, e.g., 24 months.

In examples, a Winter SKUs subcategory may include products 201 that are mostly or entirely displayed during November through December and have historically and/or are projected to meet certain seasonality sales thresholds in January through February (bold typeface). In other words, products 201 in the Winter subcategory (Winter SKUs) have historically and/or are projected to sell at least one standard deviation above annualized sales in November and December over the last X days, weeks, months, or years, e.g., 24 months.

Generally, a particular product 201 would only belong to a single seasonal sub-catalog 205 or subcategory (e.g., Winter, Spring, Summer, Fall, Holiday, etc.), though it may also belong to non-seasonal sub-catalogs 205 or subcategories. It should also be noted that the exact months in which a particular seasonal subcategory (1) are displayed; and (2) have historically and/or are projected to meet certain seasonality sales thresholds are merely exemplary and not meant to be limiting. In fact, different seasons could be defined for a marketplace all together, e.g., more or less than Winter, Spring, Summer, Fall, and Holiday.

Figure 3A:
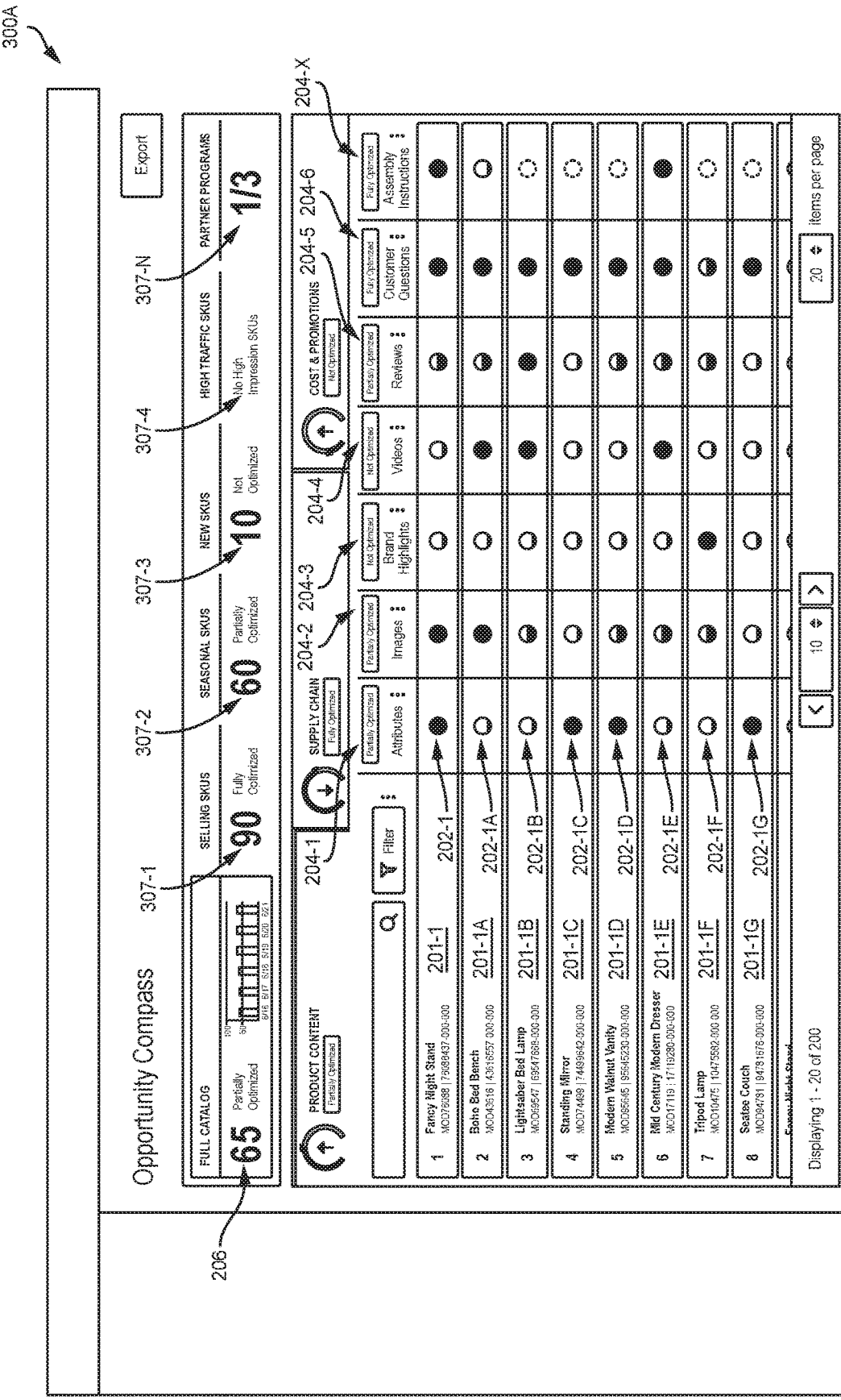
FIG. 3A is a block diagram illustrating a first example interface for a system for product catalog scoring, advising, and improving.
Figure 3B:
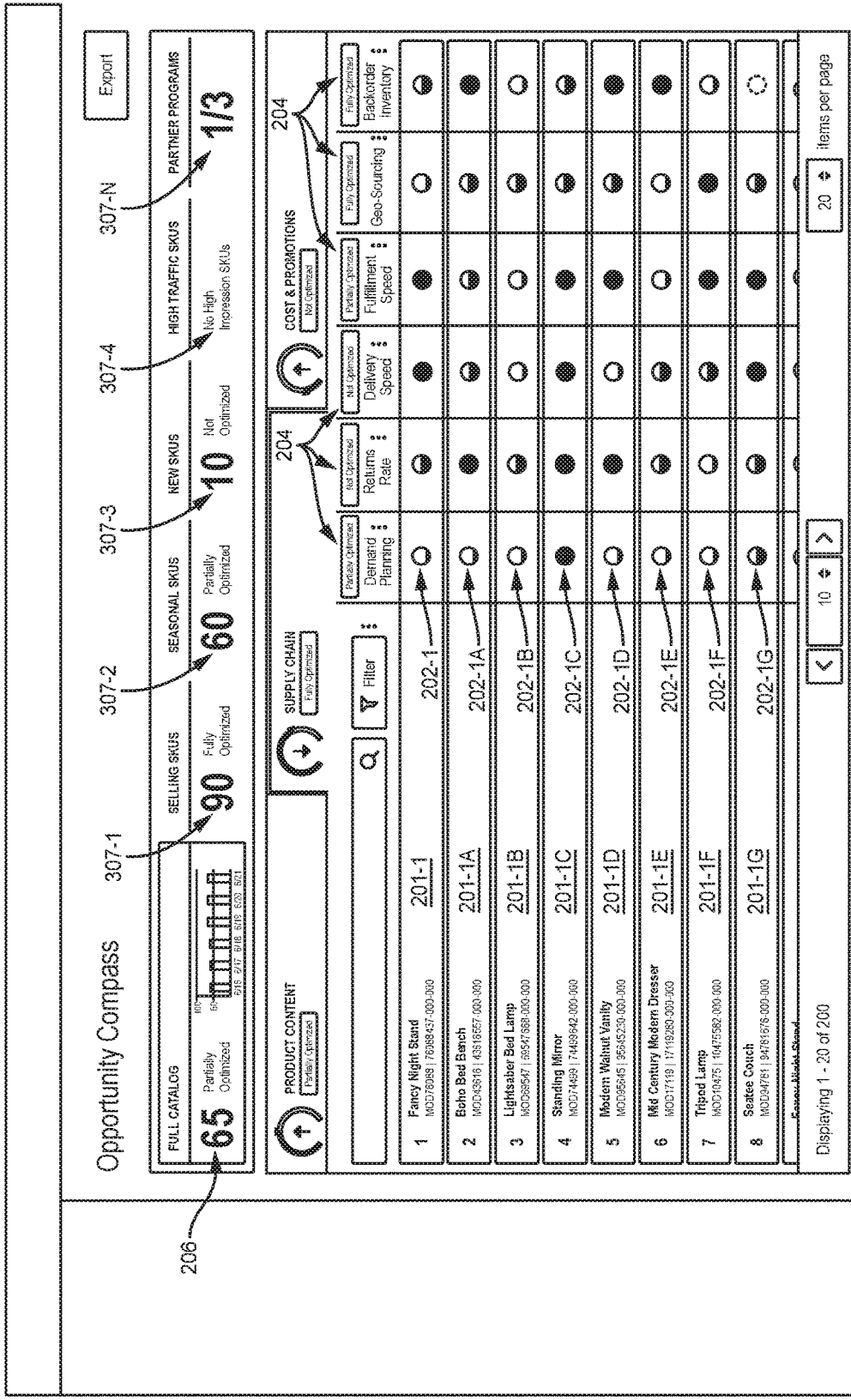
FIG. 3B is a block diagram illustrating a second example interface for a system for product catalog scoring, advising, and improving.
Figure 3C:
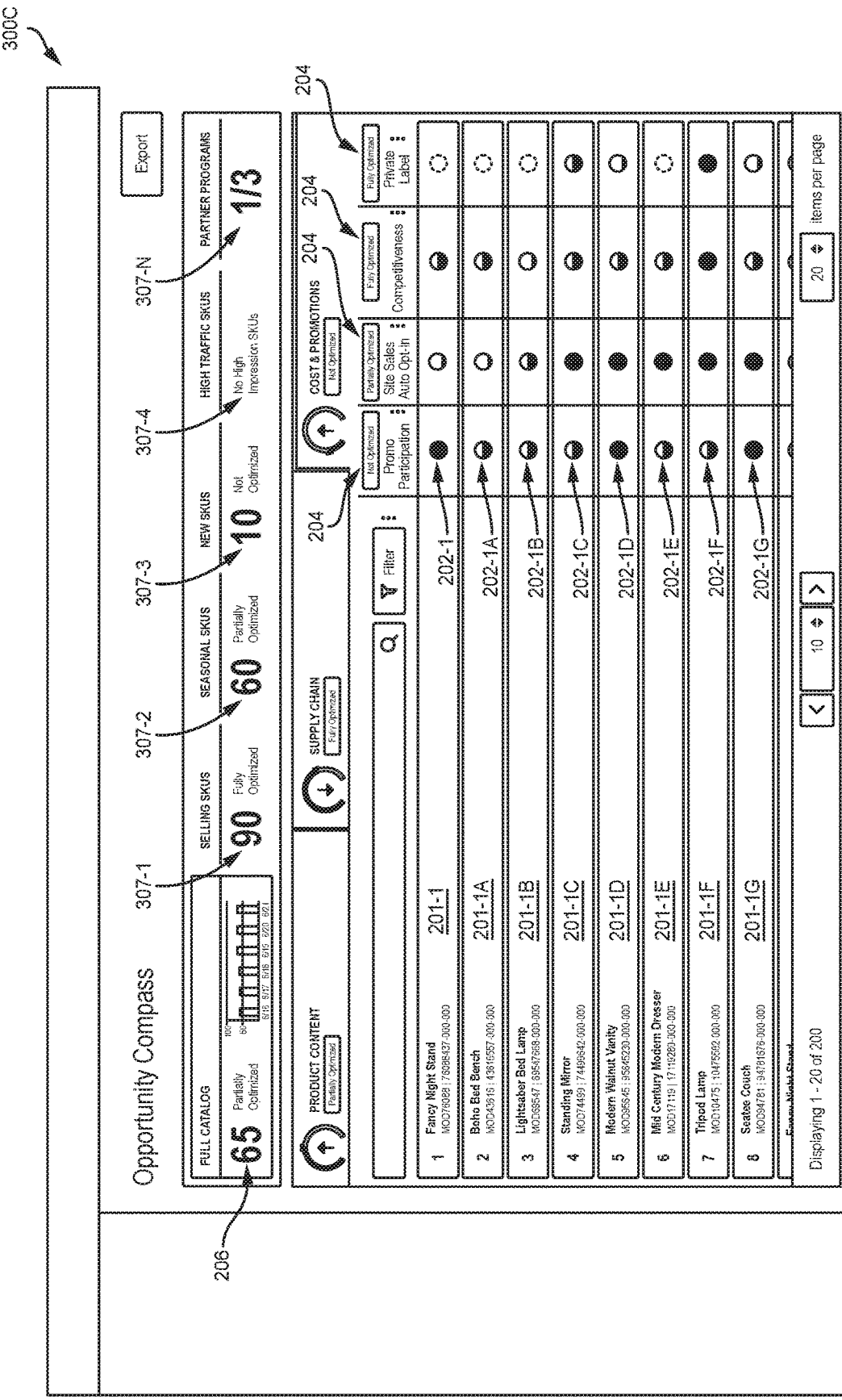
FIG. 3C is a block diagram illustrating a third example interface for a system for product catalog scoring, advising, and improving.

In some examples, only subcategories with a minimum gross merchandise sales (GMS) will be displayed to a retailer in an interface used for a system for product catalog scoring, advising, and improving (such as the example interfaces illustrated in FIGS. 3A-C). In a specific example, the top 5% (247/4774) of sub-categor(ies) sold on an online marketplace account for roughly 90% of total GMS on the online marketplace. In these example, these subcategories also represent all subcategories with GMS at or above $1 million. Therefore, in some examples, a subcategory with GMS at or above $1 million will be presented in the interface while the remaining subcategory with GMS less than $1 million GMS (95% of subcategory representing only 10% of sales) will not be presented in the interface. Therefore, the threshold for determining whether a subcategory is displayed may be based on GMS percentile of the subcategory (e.g., top 5%) or whether the subcategory GMS exceeds a predetermined dollar threshold (e.g., $1 million).

In examples, another sub-catalog 205 (New SKUs) may include products 201 in a retailer's catalog 203 that have been for sale on the marketplace for less than a predetermined time period, e.g., 30 days, 60 days, 90 days, 180 days, etc.

In examples, another sub-catalog 205 (High-Traffic SKUs) may include products 201 (SKUs) in a retailer's catalog 203 that experience both higher-than-average web traffic and lower-than-average sales, thus indicating that the products 201 could sell better if the retailer addressed underlying customer concerns. In other words, a High-Traffic SKU sub-catalog 205 includes eligible products 201 (SKUs) where: (1) the click-through rate for the product 201 is over-indexed (click-through rate for the product 201 is above the average click-through rate for its subcategory); and (2) the conversion rate for the product 201 is under indexed (conversion rate for the product 201 is below the average conversion rate for its subcategory). These products 201 (SKUs) may be ranked based on the product's item click-through index. The ranking formula (item click-through index) is determined by: comparing the product's click-through rate to its subcategory's index; comparing the product's conversion rate to its subcategory's index; and multiplying the result by a relevance factor (click count).

A simple equation for determining item click-through index for a product 201 is as follows:

$$\text{item click-through index} = \frac{\text{item indexed click-through rate}}{\text{item indexed conversion rate}} \times \text{relevance}$$

A more detailed equation for determining item click-through index for a product 201 is as follows:

$$\text{item click-through index} = \frac{\frac{\text{item indexed click-through rate}}{\text{item indexed conversion rate}}}{\left(1 + \frac{\text{item conversion rate}}{\left(\frac{1}{1,000,000} + \text{subcat conversion index}\right)}\right)} \times \frac{\text{item click count}}{100}$$

where the "item click-through rate" is the product's clicks relative to its true impressions (e.g., a metric that is directly correlate to the rate of sales of the product 201); the "subcat conversion index" is the average click-through rate for the product's subcategory; the "item indexed click-through rate" is (item indexed click-through rate)/(item indexed conversion rate); the "item conversion rate" is the product's conversion rate; the "subcat conversion index" is the average conversion rate for the product's subcategory; the "item indexed conversion rate is given by 1+(item conversion rate)/((1/1,000,000+subcat conversion index)) (where the values "1" and "1/2,000,000" prevent NULLs due to undefined values from 0 denominators); the "item click count" is the total count of clicks for the product 201. Additionally, the "relevance" is (item click count)/(M) where M is a pre-defined number to make the index values more legible, e.g., M=100. Accordingly, products 201 (SKUs) with higher net impressions (clicks) receive higher relevance than products 201 (SKUs) with lower net impressions.

In a first example of an item click-through index calculation, the "item click-through rate" is 0.06; the "subcat click-through rate index" is 0.04; the "item click count" is 1,215; the "item conversion" rate is 0.01; and the "subcat conversion index" is 0.04. In this example, the "item click-through index" is:

$$14.58 = \frac{\frac{0.06}{0.04}}{\left(1 + \frac{0.01}{\left(\frac{1}{1,000,000} + 0.04\right)}\right)} \times \frac{1,215}{100}$$

In a second example of an item click-through index calculation, the "item click-through rate" is 0.08; the "subcat click-through rate index" is 0.03; the "item click count" is 973; the "item conversion" rate is 0.01; and the "subcat conversion index" is 0.02. In this example, the "item click-through index" is:

$$17.30 = \frac{\frac{0.08}{0.03}}{\left(1 + \frac{0.01}{\left(\frac{1}{1,000,000} + 0.02\right)}\right)} \times \frac{973}{100}$$

In a third example of an item click-through index calculation, the "item click-through rate" is 0.22; the "subcat click-through rate index" is 0.04; the "item click count" is 3,621; the "item conversion" rate is 0.00; and the "subcat conversion index" is 0.04. In this example, the "item click-through index" is:

$$199.16 = \frac{\frac{0.22}{0.04}}{\left(1 + \frac{0.00}{\left(\frac{1}{1,000,000} + 0.04\right)}\right)} \times \frac{3,621}{100}$$

In a fourth example of an item click-through index calculation, the "item click-through rate" is 0.04; the "subcat click-through rate index" is 0.03; the "item click count" is 25; the "item conversion" rate is 0.06; and the "subcat conversion index" is 0.13. In this example, the "item click-through index" is:

$$0.23 = \frac{\frac{0.04}{0.03}}{\left(1 + \frac{0.06}{\left(\frac{1}{1,000,000} + 0.13\right)}\right)} \times \frac{25}{100}$$

As illustrated in FIGS. 3A-C below, sub-catalogs 205 may be scored, based on adherence of the digital product catalog representation(s) (of the product(s) 201 in the sub-catalog 205) to at least one criterion. Sub-catalog scores (or indications based on the sub-catalog scores) may be displayed to indicate to the remotely located computing device 104 which sub-catalogs 205 provide the greatest opportunity for sales improvement.

FIGS. 3A-C are block diagrams illustrating example interfaces 300A-C for a system 100 for product catalog scoring, advising, and improving. In examples, the example interfaces 300A-C may be implemented by an application on a remotely located computing device 104 and may be presented to a user of a remotely located computing device 104.

It is understood that the example interfaces 300A-C may not be able to display all the information it has access to at once, but may provide buttons to a user to scroll between pages to see more information, e.g., page 1 displays a first set of products 201 and/or criteria, page 2 displays a second set of products 201 and/or criteria, etc. Each of FIGS. 3A-C illustrate different criteria 204 for the same set of products 201, e.g., the example interface 300A of FIG. 3A may not have enough screen real estate to display all criteria 204 and/or products 201, so a user scroll to the example interface 300A of FIG. 3B to see additional criteria 204 and/or products 201 in their catalog 203, etc. Additionally, the layout of the example interfaces 300A-C may be customizable by the user, e.g., 10 items (products 201) per page, 20 items (products 201) per page, etc.

In example interfaces 300A-C, scores at the product 201 level (product scores 202) are represented by a 3-option status indicator that indicates whether a product 201 fully, partially, or does not adhere to the standard. It should be noted that only the product scores 202 for the "attributes" in FIG. 3A (and "promo participation" criteria in FIG. 3B and "demand planning" in FIG. 3C) are labeled with reference numbering for ease of illustration, but the columns of status indicators under the other criteria are also product scores 202, e.g., images, brand highlights, videos, reviews, customer questions, and assembly instructions criteria in FIG. 3A; returns rate, delivery speed, fulfillment speed, geo-sourcing, and back-order inventory criteria in FIG. 3B; and site sales auto opt-in, competitiveness, and private label criteria in FIG. 3C. In examples, each status indicator can be displayed as an outer circle with a representative fill and color indicating whether the product 201 fully, partially, or does not adhere to the standard. In examples, when a product 201 fully adheres to the standard, the status is displayed as a green outer circle (a green outer ring) with a fully filled inner circle (e.g., also a shade of green). In examples, when a product 201 partially adheres to the standard, the status is displayed as a yellow outer circle (a yellow outer ring) with a partially (e.g., half) filled inner circle (e.g., also a shade of yellow). In examples, when a product 201 does not adhere to the standard, the status is displayed as a red outer circle (a red outer ring) with a slightly (e.g., less than half) filled inner circle (e.g., also a shade of red). In examples, status indicators at some other levels (e.g., catalog scores 206 or sub-catalog scores 307-1 to 307-N) are represented as their respective numerical values, e.g., a number displayed in the following color: (1) Full Adherence: Green; (2) Partial Adherence: Yellow; (3) No Adherence: Red. In examples, status indicators at other levels (e.g., criteria scores 204) are represented by the fill color of a box with text that is based on the criteria score 204, e.g., a green box with "Fully Optimized" text; a yellow box with "Partially Optimized" text; or a red box with "Not Optimized" text.

It should be noted, however, that the status of a product 201 or group of products 201 (e.g., at the catalog or sub-catalog level) may be visually indicated in any suitable way. For example, the status could be displayed as: (1) Full Adherence: Check mark ✓; (2) Partial Adherence: ~; and (3) No Adherence: Cross ✗.

In examples, the status indicators displayed through the interface convey areas of greatest opportunity for improvement. In examples, adherence to best practices directly correlates with sales and business performance. In examples, criteria and/or products 201 marked as "Not Optimized" represent areas of greatest improvement potential, followed by "Partially Optimized" representing less room for improvement. In examples, criteria and products 201 marked as "Fully Optimized" represent little to no remaining opportunity for improvement in business performance.

In examples, the optimization level of the certain criteria are directly related to sales performance, with the caveat that some goods will still perform relatively well or poorly based on general trends in market demand. In examples, criteria that are directly related to sales performance may include attributes, images, product reviews (or simply "reviews"), customer questions, videos, copy, augmented reality assets, assembly instructions, brand highlights, option breakout, demand planning, returns rate, two day shipping coverage (also called "delivery speed"), fulfillment time/speed, sourcing accuracy (also called "geo-sourcing"), replenishment (also called "backorder inventory"), promotion participation, promotion automation (also called "site sales auto opt-in"), competitiveness, private label participation, backorder program participation, Supplier Oasis Fulfillment Services program participation, third-party billing program participation, returns program participation, sponsored products, etc. It is understood that not all possible criteria are illustrated in FIGS. 3A-C.

Attributes

In examples, product 201 exposure is the first step leading to product 201 sales. In examples, products 201 with proper attribution (keyword tagging) display in relevant product listings through online marketplaces' (such as Overstock's) search and categorical browsing results as well as popular search engines, such as Google, Yahoo!, and Bing. In examples, products 201 seen at the right time by the right customer are clicked whereas all products 201 that are not seen do not sell. In examples, proper attribution is defined by the system/methodology as assigning valid values to each essential attribute. In examples, an attribute could be any of a collection of predetermined characteristics that describes the product 201, such as size, color, shape, style, upholstery textile, etc. In examples, important (or even essential) attributes are attributes that have been identified as being market-driven, for example, frequent keyword terms that customers are using when searching Overstock.com®. In examples, when clicking the attribute status indicator for a product 201, the user is directed to a product management web application wherein they complete a form to add or modify the attributes for the product 201. In examples, the user may choose to download a spreadsheet containing all recommended SKUs with missing or erroneous essential attributes to be completed according to the company's preferred method, which can then be imported to the system through the same product management web application.

Images

In examples, products 201 with higher-quality, relevant imagery are viewed more often by customers. In examples, the rate of product 201 impressions directly correlates to the rate of product 201 sales. In examples, lower-quality or irrelevant images tend to deter customer purchase. In examples, proper image quality is defined using pixel resolution, image count/quantity, subject composition and/or photography style according to the type of product 201 being sold. In examples, customer behavior shifts according to variations in these factors based on the type of product 201 being purchased and purchases are likely to occur when imagery conveys answers to questions that customers have about the product 201. In examples, when clicking the image status indicator for a product 201, the user is directed to a product management web application wherein they complete a form to add or modify the images for the product 201. In examples, the user may choose to download a spreadsheet containing all SKUs where image improvements are recommended to be completed according to the company's preferred method, which can then be imported to the system through the same product management web application.

Product Reviews

In examples, ratings and reviews are tools used by businesses to gather customer feedback for product 201 improvement and crowdsource testimonials for good products. In examples, products 201 with higher-scoring reviews tend to sell at higher rates than products 201 with lower-scoring reviews. Even products 201 with relatively poor reviews may sell more than products 201 with no reviews based on the reason the product 201 was rated poorly. In examples, best practices in product reviews are measured using a numerical system ranging from 1.0-5.0. In examples, products 201 are optimized when ranked at the high end of the range, where statistical analysis indicates a significant positive influence on sales. In examples, products 201 are not optimized when analysis indicates a significant negative influence on sales. In examples, products 201 are partially optimized when reviews have no significant influence on sales. In examples, when clicking on the review status indicator for a product 201, the user is directed to a web interface presenting all customer reviews for the product 201. In examples, the user is not permitted to modify reviews but are encouraged to address concerns in the customer experience (whether through product 201 enhancements, supply chain processes, etc.) made known through the review process.

Customer Questions

In examples, customer questions are a tool used to identify areas in which the retailer or manufacturer failed to articulate valuable details for a product 201 and are a method for providing good customer service. In examples, a customer question represents a potentially missed sale as the customer may have made the purchase had the missing detail been made known to the customer. In examples, providing answers to customer questions informs the customer in the purchase decision and if caught early enough has the potential to save the sale. In examples, proper engagement with customer is measured using rate at which the partner company responds and/or the quantity of outstanding customer inquiries. In examples, when clicking on the customer question status indicator for a product 201, the user is directed to a web interface presenting all customer questions for the product 201. In examples, the user can provide answers to any question on behalf of the company.

Videos

In examples, online video has started a revolution in driving customer engagement in recent years. In examples, products 201 that include multimedia content have higher SEO ranks and are discovered more easily in search engine results. In examples, product-specific videos provide additional context reducing the likelihood of products 201 being returned. In examples, best practices in videos is that a product 201 is accompanied by a promotional video communicating the products 201 features, benefits and specifications. In examples, less important but still valuable are videos that promote a product line or brand of products. In examples, products 201 lacking video multimedia content are not optimized. In examples, when clicking the video status indicator for a product 201, the user is directed to a product management web application wherein they complete a form to add or modify the videos associated with the product 201. In examples, the user may choose to download a spreadsheet containing all products 201 where video improvements are recommended to be completed, which can then be imported to the system through the same product management web application.

Copy

In examples, copy refers to the content describing the product 201 as it is presented to the customer. In examples, unique content drives SEO ranking. In examples, descriptive copy meets certain criteria, such as word count. In examples, when clicking the Copy status indicator for a product 201, the user is directed to a product management web application wherein they complete a form for a product 201 to add or modify the assets associated with the product 201. In examples, the user may choose to download a spreadsheet containing all products 201 where copy improvements are recommended to be completed, which can then be imported to the system through the same product management web application.

Augmented Reality (AR) Assets

In examples, online marketplaces (such as Overstock) have various implementations of augmented reality allowing customers to view AR-optimized products 201 in virtual environments (such as their living room) using the camera on their mobile device. In examples, this feature informs customers in purchase decisions by allowing them to visualize the product 201 in its intended environment. In examples, best practice in AR assets is that a product 201 is accompanied by a 3D image that can be utilized in Overstock's AR systems. In examples, products 201 in specific product 201 categories (such as furniture) lacking AR assets are not optimized. In examples, when clicking the AR assets status indicator for a product 201, the user is directed to a product management web application wherein they complete a form to add or modify the assets associated with the product 201. In examples, the user may choose to download a spreadsheet containing all products 201 where AR asset improvements are recommended to be completed, which can then be imported to the system through the same product management web application.

Assembly Instructions

In examples, customers expect to be provided instructions for products 201 that require assembly. In examples, products 201 lacking adequate instructions tend to receive poorer customer reviews and higher return rates. In examples, when clicking the Assembly Instructions status indicator for a product 201, the user is directed to a product management web application wherein they complete a form for a product 201 to add or modify the assets associated with the product 201. In examples, the user may choose to download a spreadsheet containing all products 201 where assembly instructions improvements are recommended to be completed, which can then be imported to the system through the same product management web application.

Brand Highlights

In examples, brand highlights are a graphical element added to a product 201 providing an opportunity to showcase a business's or product line's brand identity, similar to a miniature digital brochure. In examples, our data tells us there is a positive sales correlation with Brand Highlights. In examples, best practice in brand highlights is measured in whether a product 201 is accompanied by a brand highlight. In examples, when clicking the brand highlight status indicator for a product 201, the user is directed to a product management web application wherein they complete a form to add or replace the brand highlight for the product 201. In examples, the user may choose to download a spreadsheet containing all SKUs where brand highlights are recommended to be completed according to the company's preferred method, which can then be imported to the system through the same product management web application.

Option Breakout

In examples, option breakouts show the various options for a particular product 201 (such as color, size, quantity in package, etc.). Therefore, an option breakout status indicator may optionally be displayed to the user, which indicates adherence to this criteria. In examples, when clicking the option breakout status indicator for a product 201, the user is directed to a product management web application wherein they complete a form to add or replace the brand highlight for the product 201. In examples, the user may choose to download a spreadsheet containing all products 201 where option breakouts are recommended to be completed according to the company's preferred method, which can then be imported to the system through the same product management web application.

Demand Planning

In examples, out-of-stock products 201 account for a large portion of missed business opportunities through missed sales. In examples where a product 201 goes out of stock, the first line of defense is to sell from another supplier (typically causing the price to increase as the lowest-cost seller is presented first). In examples, if no other seller is available and the product 201 is enrolled in the backorder program, the product 201 will go on backorder and still be available for purchase with a delayed delivery date. In examples, after these options have been exhausted, the product 201 will simply not be viewable on site resulting in missed customer impressions and missed sales. In examples, depending on the product 201 classification, a product 201 may be expected to be available in stock 100%, 92%, or 90% of the time. In examples, products 201 that do not meet their in-stock percentage are not considered optimized. In examples, when clicking the demand planning status indicator for a product 201, the user is directed to an inventory management web application wherein they complete a form to allocate product inventory and identify the warehouse where the inventory resides.

Returns Rate

In examples, a low returns rate is a strong indicator of high customer satisfaction; the inverse is true for a high returns rate. In examples, best practices in return rates are identified based on its return performance relative to its index (the average return rate for all products 201 within specified product 201 categories). In examples, when clicking on the returns rate status indicator, the user is presented with the most common causes for returns and is encouraged to perform root-cause analysis on high-return items.

2-Day Shipping Coverage (also called "Delivery Speed")

In examples, the guaranteed 2-day shipping status indicator appears on products 201 that are guaranteed to ship to the customer within 2 days. In examples, qualification for the status indicator is based on the customer's shipping zip code and the historical fulfillment time over the past 90 days. In examples, a guaranteed 2-day shipping status indicator substantially improves the likelihood that a customer will order the product 201. In examples, best practices in 2-day shipping are identified by auditing the 90-day history for each product 201 that should reasonably be expected to deliver in 2 days. In examples, the ratio at which the product 201 is actually delivered within a 2-day period over that 90 days is used to determine the optimization level of the product 201. In examples, when clicking on the 2-day shipping status indicator, the user is presented with a list of recommendations for improving 2-day delivery on their products 201 including improving fulfillment times at their warehouses, enrolling in the online marketplace's (such as Overstock's) fulfillment services, and others.

Fulfillment Time/Speed

In examples, in conjunction with the 2-day coverage criterion, fulfillment time is a primary driver for whether a product 201 can be delivered in 2 days. In examples, each additional day spent fulfilling an order is a day lost where the product 201 could be in transit. In examples, any product 201 that requires more than 1 day to fulfill has missed its 2-day shipping window and forfeits the 2-day shipping status indicator on the retail website. In examples, proper fulfillment time is based on the product's expected delivery period: same-day fulfillment for small parcel products 201 or 2-day fulfillment for LTL (Less than truckload) products. In examples, when clicking on the fulfillment time status indicator, the user is presented with a list of recommendations for improving fulfillment times at their warehouse or enrolling the product 201 in the online marketplace's (such as Overstock's) fulfillment services.

Sourcing Accuracy (also called "Geo-Sourcing")

In examples, sourcing accuracy refers to orders being fulfilled from the warehouses the customer expects. In examples, if an order is guaranteed to be delivered in 2 days based on fulfillment at the California warehouse, but the retailer fulfills the order from New York warehouse, the product 201 stands a good chance of not delivering on the 2-day delivery commitment. In examples, proper sourcing accuracy is based on two zip codes, the zip code of the warehouse that is closest to the customer that houses the product 201 (used to estimate delivery times) and the zip code of the warehouse from which the product 201 ships. The rate at which these zip codes match is used to determine optimization of sourcing location accuracy. In examples, when clicking on the sourcing accuracy status indicator, the user is presented with recommendations for improving sourcing location accuracy, particularly to ship from the warehouse that is identified in the order.

Replenishment (also called "Backorder Inventory")

In examples, replenishment refers to how quickly stock is replenished. Therefore, a replenishment status indicator may optionally be displayed to the user, which indicates adherence to this criteria. In examples, when clicking on the replenishment status indicator, the user is presented with recommendations for improving replenishment speed.

Promo Participation

In examples, promo participation refers to the level at which partners include their products 201 in promotional activities, such as "10% Off" sales. In examples, online marketplace's (such as Overstock's) business models are very promotion driven and products 201 sell at much higher rates during promotional periods. In examples, proper promotion participation is based on the rate at which a product 201 participates in promotions, or rather, the number of promotions in which a product 201 participates out of the total promotions for which it qualifies. In examples, the standard to be considered fully optimized is that a product 201 should participate in two-thirds of the promotions for which it's eligible to take full advantage of the business strategy and at least half of all eligible promotions to be considered partially optimized. In examples, when clicking on the promo participation status indicator, the user is directed to the promotions application where they are able to view upcoming promotions and manually opt in eligible products.

Promo Automation (also called "Site Sales Auto Opt-In")

In examples, promo automation refers to a system of rules that partners can create that automatically opt in eligible products 201 to promotions that meet the criteria of the rules. In examples, a partner can indicate in a rule that a particular product 201 should participate in all ten percent-off promotions. In examples, recognizing that not all products 201 are capable of participating in promotions (for example, some products' margins may be too small to take ten percent off the retail price), the standard is that each product 201 is periodically considered whether site sale participation can be automated. In examples, a product 201 is considered fully optimized if either (1) the partner has applied a promotion rule; or (2) the product 201 has been marked as being unable to participate in promo automation. In examples, when clicking on the promo automation (Site Sales Auto Opt-In) status indicator, the user is directed to an application that grants the user the ability to add a single rule to their entire product catalog or to manage rules for each product 201 individually.

Competitiveness

In examples, online marketplaces (such as Overstock) strive to be low-cost leaders on high-quality products 201 (such as home goods). In examples, competitiveness is the metric used to determine whether the price of the product 201 is competitive relative to other retailers. In examples, proper competitiveness is determined by whether the price of the product 201 is competitive relative to products 201 on other retail sites. In examples, products 201 are considered fully optimized when the retail price is competitive relative to the lowest price of matching products 201 sold by other retailers. In examples, the product 201 is not optimized when the price is uncompetitive. In examples, when clicking on the competitiveness indicator, the user is directed to a price management web application that provides the user with various options to reduce the price of the product 201.

Private Label Participation

In examples, participating in private labeling can increase sales. Therefore, a private label participation status indicator may optionally be displayed to the user, which indicates adherence to this criteria. In examples, when clicking on the private label participation, the user is directed to an application that enables the user to enable private label participation for a product 201.

Backorder Program Participation

In examples, products 201 enrolled in a backorder program can continue to be sold even after they have run out of inventory. In examples, this prevents a portion of lost sales for customers who are willing to postpone delivery to receive an online marketplace's (such as Overstock's) lower prices. In examples, when clicking on the backorder program participation status indicator, the user is directed to an application that enables the user to enable backorder program participation for a product 201.

Logistics Service (such as Supplier Oasis Fulfillment Services Program) Participation In examples, logistics services (such as Supplier Oasis Fulfillment Services (SOFS)) offer logistics options to companies interested in fulfillment services, flexible warehousing, freight savings, and fast delivery to customer. In examples, online marketplaces have multiple warehouses strategically located that deliver guaranteed 2-day shipping to a high percentage (such as 99%) of the United States. In examples, when clicking on the logistics service participation status indicator, the user is directed to an application that enables the user to enable logistics service participation for a product 201.

Third-Party Billing Program Participation

In examples, a third-party billing program (such as Overstock's 3PB program) permits partners to leverage an online marketplace's (such as Overstock's) large-scale contracts with top carriers to get discounted shipping rates. In examples, lower shipping rates create an opportunity to lower the site prices making SKUs more competitive. In examples, when clicking on the private label participation status indicator, the user is directed to an application that enables the user to enable third-party billing program participation for a product 201.

Returns Program Participation

In examples, participating in a particular returns program, which may allow for an easier or less expensive returns experience for customers, can increase the likelihood of a sale. In examples, clicking on the returns program participation status indicator, the user is directed to an application that enables the user to enable returns program participation for a product 201.

Sponsored Products

In examples, a strategically-identified portion of real estate on each product listing is designated for promoting retailer-sponsored products 201 to customers visiting the site. Retailers have the option to bid on those spots as an opportunity to obtain better visibility for products 201 that they think customers are seeking. A status indicator (e.g., a 3-option indicator or a numeric score) may be displayed to make retailers aware of which products 201 in their catalog could see the greatest benefit from sponsorship.

Based on sales data from millions of products 201 across thousands of retailers, some products 201 may be identified as good candidates for sponsored product 201 placement. The status indicator generated for each product 201 is derived based on: (1) whether a product 201 is a good candidate to be sponsored by the retailer; and (2) the product's sponsorship history. When clicking the sponsored products 201 status indicator, the user is directed to a campaign management web application where they complete a series of forms that create a new marketing campaign consisting of the placement bid, the collection of SKUs eligible to be placed, and the duration of the campaign. Products 201 (SKUs) are added to the campaign via web form or through file upload.

Figure 4:
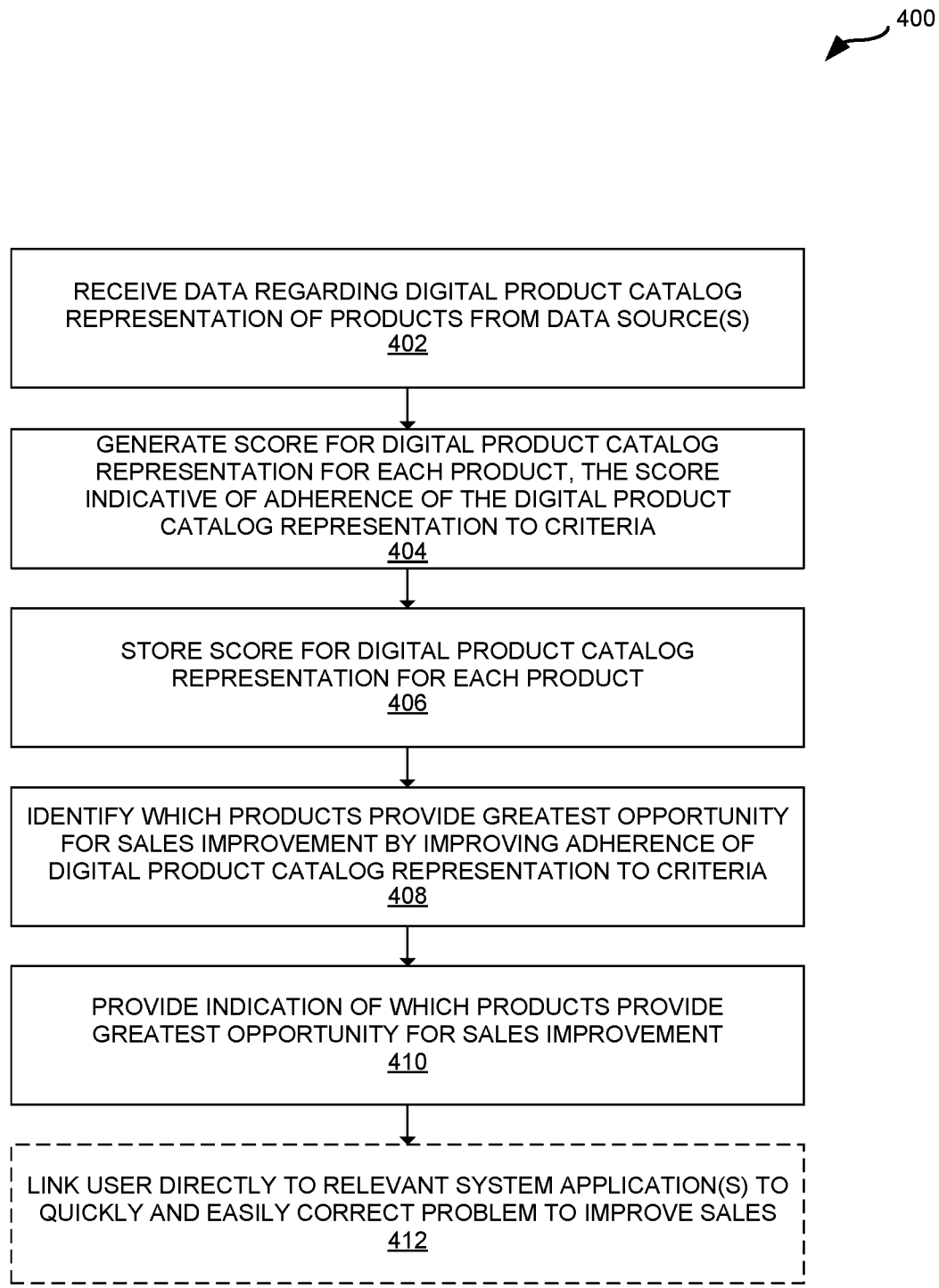
FIG. 4 is a flow diagram illustrating an example method for product catalog scoring, advising, and improving.

FIG. 4 is a flow diagram illustrating an example method 400 for product catalog scoring, advising, and improving. The method 400 may be performed by the computing device(s) 102, the remotely located computing device(s) 104, the data sources 106, and the network(s) 108.

The method 400 begins at block 402 with receiving data regarding digital product catalog representations of products 201 from data source(s) 106. In examples, the computing device(s) 102 receive the data from the data source(s) 106 via at least one network 108. In some examples, the data source(s) 106 send the data to the computing device(s) 102 in response to a request from the computing device(s) 102, e.g., which the computing device(s) 102 send in response to a request from a remotely located computing device 104 for data and/or analysis.

The method 400 proceeds to block 404 with generating a score for digital product catalog representation(s) for each product 201, the score indicative of adherence of the digital product catalog representation to criteria. In examples, criterion may include any of the following: attributes, images, product reviews, customer questions, videos, copy, augmented reality assets, assembly instructions, brand highlights, option breakout, demand planning, returns, rate, two day shipping coverage, fulfillment time, sourcing accuracy, replenishment, promotion participation, promotion automation, competitiveness, private label participation, backorder program participation, Supplier Oasis Fulfillment Services program participation, third-party billing program participation, returns program participation, or sponsored products.

In example embodiments, a product score 202 is calculated for each product 201. In examples, each product score 202 is a numerical value from 0 to 100 indicating the adherence of the product 201 to at least one standard criterion. For a given product 201, a different product score 202 could be determined for any of (or each of) the criteria listed above, e.g., a particular product 201 may have an associated product score for its adherence to the attributes criteria, images criteria, product reviews criteria, etc.

In examples, a criteria score 204 could be determined for one or more of the criteria. In examples, a criteria score 204 is a numerical value from 0 to 100 that represents the aggregate (e.g., average, weighted average, mean, etc.) of all product scores 202 as they adhere to the specified standard criterion. For example, a different criteria score 204 could be determined for each of multiple criteria, e.g., a first criteria score 204 for adherence of all products 201 (e.g., in a catalog 203) to the attributes criteria, a second criteria score 204 for adherence of all products 201 to the images criteria, a third criteria score 204 for adherence of all products 201 to the product reviews criteria, etc.

In examples, a catalog score 206 is a numerical value from 0 to 100 that represents the aggregate (e.g., average, weighted average, mean, etc.) of all product scores 202 within a high-opportunity subset of the product catalog 203 as they adhere to all best-practice standard criteria.

In examples, a sub-catalog score 307 is a numerical value from 0 to 100 that represents the aggregate (e.g., average, weighted average, mean, etc.) of all product scores 202 within a sub-catalog 205 as they adhere to one or more criteria, e.g., a different sub-catalog score(s) 307 may be determined for a retailer's Selling SKUs sub-catalog 205, Seasonal SKUs sub-catalog(s) 205, New SKUs sub-catalog 205, and/or High-Traffic SKUs sub-catalog 205.

The method 400 proceeds to block 406 with storing score(s) for digital product catalog representation(s) for each product 201.

The method 400 proceeds to block 408 with identifying which products 201 provide the greatest opportunity for sales improvement by improving adherence of digital product catalog representation(s) to criteria. In examples, block 408 includes determining which product(s) 201 within a catalog 203 or sub-catalog 205 have the lowest product score 202, e.g., the products 201 with lowest Z product scores 202 (where Z is a predetermined integer) or all products 201 with product scores 202 below a predetermined threshold.

The method 400 proceeds to block 410 with providing indication(s) of which products 201 provide greatest opportunity for sales improvement. In some examples, an indication can be displayed in an interface 300A-C (e.g., similar to FIGS. 3A-C) using a 3-option status indicator that indicates whether a particular product 201, category 203, or sub-catalog 205 (or other group of products 201) fully, partially, or does not adhere to the criteria, e.g., an indication may relate to a product score 202, a criteria score 204, a catalog score 206, or a sub-catalog score 307. For example, product scores 202-1 through 202-1G in FIGS. 3A-C are examples of indicators displayed using a 3-option status indicator. In examples, the color(s) used in each 3-option status indicator would correspond to a numerical value for the product 201, category 203, or sub-catalog 205 (or other group of products 201). For example, when a product 201, category 203, or sub-catalog 205 fully adheres to the standard, the outer circle of the 3-status indicator may be green with a fully filled inner circle (e.g., also a shade of green); when a product 201, category 203, or sub-catalog 205 partially adheres to the standard, the outer circle of the 3-status indicator may be yellow with a partially filled inner circle (e.g., also a shade of yellow); and when a product 201, category 203, or sub-catalog 205 does not adheres to the standard, the outer circle of the 3-status indicator may be red with an empty or less-than-half filled inner circle (e.g., also a shade of red if some filling is used). In some examples, products 201, categories 203, or sub-catalogs 205 are determined to fully, partially, or not adhere by comparing their product score 202, catalog score 206, or sub-catalog score 307 to a threshold, e.g., scores less than a first threshold are deemed to not adhere, scores between the first and a second threshold are deemed to partially adhere, and scores above the second threshold are deemed to fully adhere to the standard.

Additionally, or alternatively, a numeric product score 202, criteria score 204, catalog score 206, and/or sub-catalog score 307 may be displayed (instead of, or in addition to, using a 3-option status indicator(s)), e.g., a number displayed in the following color: (1) Full Adherence: Green; (2) Partial Adherence: Yellow; (3) No Adherence: Red. The catalog score 206 and sub-catalog scores 307-1 through 307-3 are illustrated in FIGS. 3A-C with numeric scores, as an example. Alternatively, if a retailer has no products 201 in a particular sub-catalog 205, the interface 300A-C may display text indicating that fact, e.g., the sub-catalog score 307-4 is an example of this.

Additionally, or alternatively, status indicator(s) at some levels (e.g., criteria scores 204) may represented by the fill color of a box with text that is based on the criteria score 204, e.g., a green box with "Fully Optimized" text; a yellow box with "Partially Optimized" text; or a red box with "Not Optimized" text. The criteria scores 204 are illustrated in FIGS. 3A-C with numeric scores, as an example.

Additionally, or alternatively, status indicator(s) at some levels (e.g., sub-catalog score 307-N) may be represented as a fraction displayed in a color that is based on a score (e.g., the sub-catalog score 307-N), e.g., a numerator of the number of qualifying items (e.g., number of partner programs the retailer participates in) and a denominator of the number of total items (e.g., number of partner programs available to the retailer). In examples, the fraction can be displayed in the following color: (1) Full Adherence: Green; (2) Partial Adherence: Yellow; (3) No Adherence: Red. In some examples, the sub-catalog score 307-N is determined to fully, partially, or not adhere by comparing the fraction to a threshold, e.g., fractions less than a first threshold are displayed in red, fractions between the first and a second threshold are displayed in yellow, and fractions above the second threshold are displayed in green.

Different types of status indicators can be displayed in an interface. In some examples, status indicators of individual product 201 adherence to a criteria (relating to a product scores 202) are displayed using a 3-option status indicator, while indications of adherence of a catalog 203 or sub-catalogs 205 to a criteria (relating to a catalog score 206 or sub-catalog scores 307) is/are displayed using numeric score(s) (e.g., each from 0 to 100) or fractions. Any combination of indications (relating product score(s) 202, a criteria score(s) 204, a catalog score(s) 206, and/or a sub-catalog score(s) 307) may be displayed at the same time.

The method 400 proceeds with optional block 412 with linking users directly to relevant system application(s) to quickly and easily correct problem to improve sales. In examples, the computing device(s) 102 may provide a direct link to the remotely located computing device 104 (e.g., via a system application) to update the digital product catalog representation for a particular product 201 to improve adherence of the digital product catalog representation to the at least one criterion. In examples, when clicking any of the status indicators (or numeric scores) relating to a product score 202, a criteria score 204, a catalog score 206, or a sub-catalog score 307 (or a numeric product score(s) 202, a criteria score(s) 204, a catalog score(s) 206, or a sub-catalog score(s) 307), the user may be directed to a product management web application, product management web application, inventory management web application, price management web application, and/or campaign management web application, respectively, where they can modify digital product catalog representation(s) of corresponding product(s) 201 to better adhere to criteria (and improve scores and sales).

In examples, the devices and systems herein are implemented using memory and/or processors. In examples, the memory can be any device, mechanism, or populated data structure used for storing information. In examples, the memory can be or include any type of volatile memory, nonvolatile memory, and/or dynamic memory. In examples, the memory can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory. The memory may be used to store instructions for running one or more applications or modules on the processor. In examples, the memory could be used in one or more examples to house all or some of the instructions needed to execute the functionality of the any of the systems devices described herein. The processor can be any known processor, such as a general purpose processor (GPP) or special purpose (such as a field-programmable gate array (FPGA), application-specific integrated circuit (ASIC) or other integrated circuit or circuitry), or any programmable logic device.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 5:
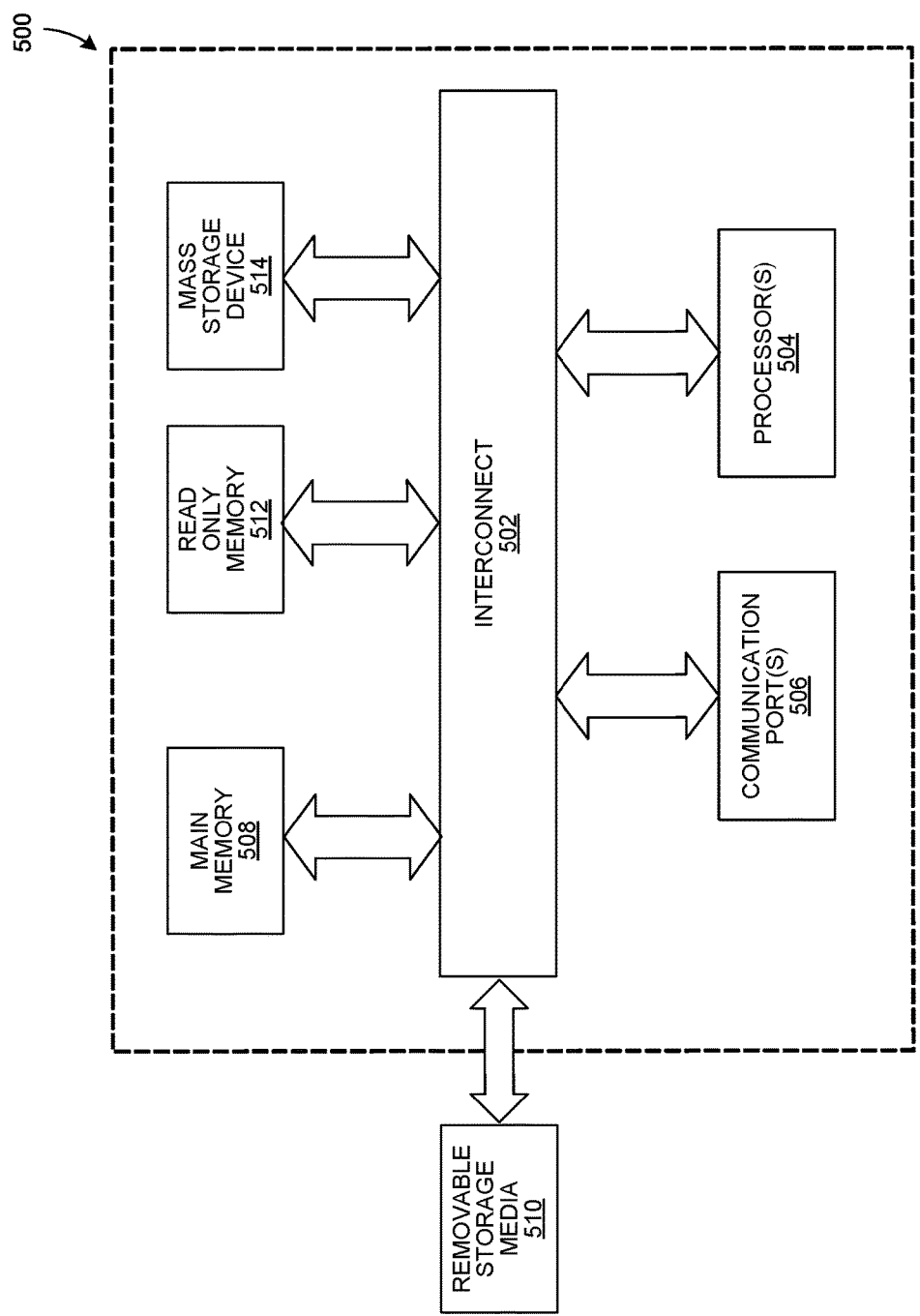
FIG. 5 is a block diagram illustrating an example computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is a block diagram illustrating an example computer system 500 with which embodiments of the present disclosure may be utilized. According to the present example, the computer system 500 includes an interconnect 502, at least one processor 504, at least one communication port 506, at least one main memory 508, at least one removable storage media 510, at least one read only memory 512, and at least one mass storage device 514.

The at least one processor 504 can be any known processor. The at least one communication port 506 can be or include, for example, any of an RS-232 port for use with a modem-based dialup connection, a 10/100 Ethernet port, or a Gigabit port using copper or fiber. The nature of the at least one communication port 506 may be chosen depending on a network such as a Local Area Network (LAN), Wide Area Network (WAN), or any network to which the computer system 500 connects. The at least one main memory 508 can be Random Access Memory (RAM), or any other dynamic storage device(s) commonly known in the art. The at least one read only memory 512 can be any static storage device(s) such as Programmable Read Only Memory (PROM) chips for storing static information such as instructions for the at least one processor 504.

The at least one mass storage device 514 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 502 can be or include one or more buses, bridges, controllers, adapters, and/or point-to-point connections. Interconnect 502 communicatively couples the at least one processor 504 with the other memory, storage, and communication blocks. Interconnect 502 can be a PCI/PCI-X or SCSI based system bus depending on the storage devices used. The at least one removable storage media 510 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Figure 6:
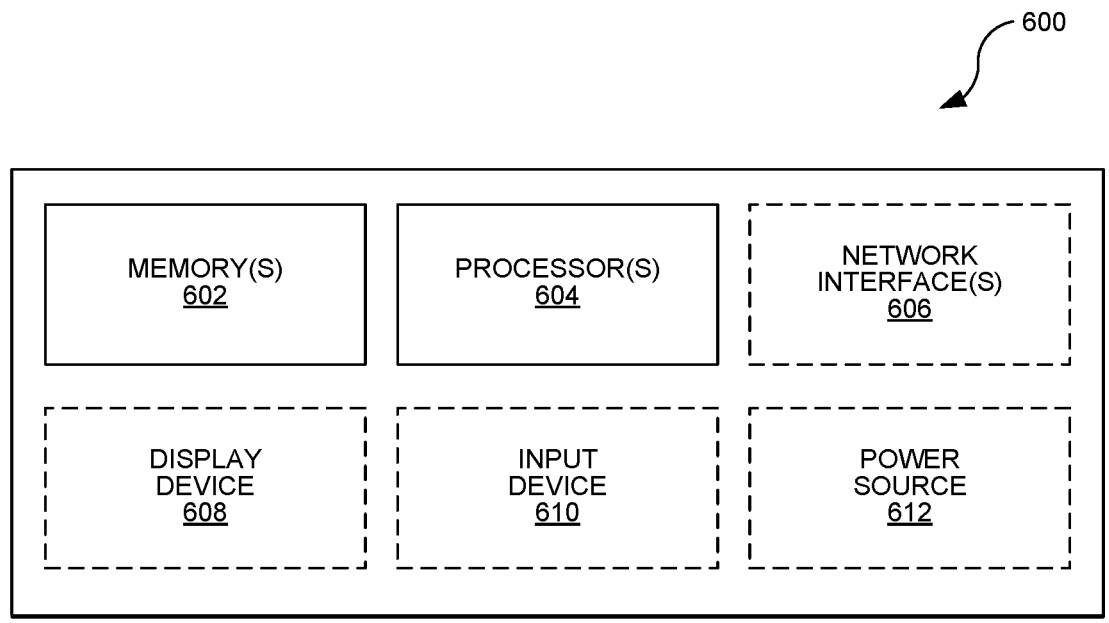
FIG. 6 is a block diagram illustrating another example computing device.

FIG. 6 is a block diagram illustrating another example computing device 600. The example computing device 600 may be used to implement any of the computing device(s) 102, the remotely located computing device(s) 104, the data sources 106, the asset exchange the identity services provider, the vault systems 1250, and/or the optional record keeping system 1252. The computing device 600 includes at least one memory 602, at least one processor 604, optional at least one network interface 606, optional display device 608, optional input device 610, and optional power source 612.

In examples, the at least one memory 602 can be any device, mechanism, or populated data structure used for storing information. In examples, the at least one memory 602 can be or include any type of volatile memory, non-volatile memory, and/or dynamic memory. In examples, the at least one memory 602 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 602 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 602. The at least one memory 602 may be used to store instructions for running one or more applications or modules on the at least one processor 604. In examples, the at least one memory 602 could be used in one or more examples to house all or some of the instructions needed to execute the functionality discussed herein, e.g., in FIGS. 3-4 and 6-10.

The at least one processor 604 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein (e.g., in FIGS. 3-4, 6-10 and 13-16C) may be implemented by the at least one processor 604 and the at least one memory 602.

In examples, the at least one optional network interface 606 includes or is coupled to at least one optional antenna for communication with a network (such as one of the at least one networks 108 of system 100). In examples, the at least one optional network interface 606 includes at least one of an Ethernet interface, a cellular radio access technology (RAT) radio, a Wi-Fi radio, a Bluetooth radio, or a near field communication (NFC) radio. In examples, the at least one optional network interface 606 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 606 includes a Wi-Fi (IEEE 802.11) radio configured to communicate with a wireless local area network that communicates with the remote server, rather than a wide area network. In examples, the at least one optional network interface 606 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 608 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 610 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 608 is combined with the optional at least one input device 610 into a human machine interface (HMI) for user interaction with the computing device(s) 102, the remotely located computing device(s) 104, and/or the data sources 106. In examples, at least one optional power source 612 is used to provide power to the various components of the computing device 600.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

While detailed descriptions of one or more embodiments of the disclosure have been given above, various alternatives, modifications, and equivalents will be apparent to those skilled in the art without varying from the spirit of the disclosure. In examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a computing system comprising: at least one processor; at least one memory communicatively coupled to the at least one processor; at least one storage device communicatively coupled to the at least one processor and configured to store data; at least one network interface communicatively coupled to the at least one processor and configured to communicate with at least one data source and at least one remotely located computing device; wherein the at least one network interface is configured to receive data regarding a digital product catalog representation of a plurality of products from at least one data source; wherein the at least one processor is configured to: generate a respective score for the digital product catalog representation for each respective product of the plurality of products, the score indicative of adherence of the digital product catalog representation for each respective product of the plurality of products to at least one criterion; store the respective score for the digital product catalog representation for each respective product using the at least one storage device; and identify which products provide the greatest opportunity for sales improvement by improving adherence of the digital product catalog representation to the at least one criterion; and wherein the at least one network interface is configured to provide an indication of which products provide the greatest opportunity for sales improvement to the at least one remotely located computing device.

Example 2 includes the computing system of Example 1, wherein the at least one network interface is configured to provide a direct link to a system application to update the digital product catalog representation for a particular product to improve adherence of the digital product catalog representation to the at least one criterion.

Example 3 includes the computing system of any of Examples 1-2, wherein the at least one criterion includes at least one of: attributes, images, product reviews, customer questions, videos, copy, augmented reality assets, assembly instructions, brand highlights, option breakout, demand planning, returns, rate, two day shipping coverage, fulfillment time, sourcing accuracy, replenishment, promotion participation, promotion automation, competitiveness, private label participation, backorder program participation, Supplier Oasis Fulfillment Services program participation, third-party billing program participation, returns program participation, or sponsored products.

Example 4 includes the computing system of any of Examples 1-3, further comprising: wherein the at least one network interface is configured to provide the indication, which corresponds to a digital product catalog representation for a particular product, to the at least one remotely located computing device.

Example 5 includes the computing system of any of Examples 1-4, further comprising: wherein the at least one network interface is configured to provide the indication, which corresponds to digital product catalog representations for products in a particular catalog, sub-catalog, or other grouping, to the at least one remotely located computing device.

Example 6 includes the computing system of Example 5, wherein the sub-catalog is one of: a selling SKUs sub-catalog with products, in a retailer's catalog, which have been purchased on an online marketplace by any customer within a previous window of time; a seasonal SKUs sub-catalog with products, in the retailer's catalog, considered to be seasonal; a new SKUs sub-catalog with products, in the retailer's catalog, which have been for sale on the online marketplace for less than some time period; and a high-traffic SKUs sub-catalog with products, in the retailer's catalog, which experience both higher-than-average web traffic and lower-than-average sales compared to other products in a same subcategory of products.

Example 7 includes the computing system of any of Examples 1-6, wherein the indication is provided by displaying: a 3-option status indicator that indicates whether at least one digital product catalog representation for a particular product, products in a catalog, or products in a sub-catalog fully, partially, or does not adhere to the at least one criterion; or a numeric score indicating whether at least one digital product catalog representation for a particular product, products in a catalog, or products in a sub-catalog fully, partially, or does not adhere to the at least one criterion.

Example 8 includes a computerized method comprising: receiving data regarding a digital product catalog representation of a plurality of products from at least one data source at a computing system; generating a respective score for the digital product catalog representation for each respective product of the plurality of products, the score indicative of adherence of the digital product catalog representation for each respective product of the plurality of products to at least one criterion at the computing system; storing the respective score for the digital product catalog representation for each respective product using at least one storage device; identifying which products provide the greatest opportunity for sales improvement by improving adherence of the digital product catalog representation to the at least one criterion; and providing an indication of which products provide the greatest opportunity for sales improvement to at least one remotely located computing device from the computing system.

Example 9 includes the computerized method of Example 8, further comprising: providing a direct link to a system application to update the digital product catalog representation for a particular product to improve adherence of the digital product catalog representation to the at least one criterion.

Example 10 includes the computerized method of any of Examples 8-9, wherein the at least one criterion includes at least one of: attributes, images, product reviews, customer questions, videos, copy, augmented reality assets, assembly instructions, brand highlights, option breakout, demand planning, returns, rate, two day shipping coverage, fulfillment time, sourcing accuracy, replenishment, promotion participation, promotion automation, competitiveness, private label participation, backorder program participation, Supplier Oasis Fulfillment Services program participation, third-party billing program participation, returns program participation, or sponsored products.

Example 11 includes the computerized method of any of Examples 8-10, further comprising: providing the indication, which corresponds to a digital product catalog representation for a particular product, to the at least one remotely located computing device.

Example 12 includes the computerized method of any of Examples 8-11, further comprising: providing the indication, which corresponds to digital product catalog representations of products in a particular catalog, sub-catalog, or other grouping, to the at least one remotely located computing device.

Example 13 includes the computerized method of Example 12, wherein the sub-catalog is one of: a selling SKUs sub-catalog with products, in a retailer's catalog, which have been purchased on an online marketplace by any customer within a previous window of time; a seasonal SKUs sub-catalog with products, in the retailer's catalog, considered to be seasonal; a new SKUs sub-catalog with products, in the retailer's catalog, which have been for sale on the online marketplace for less than some time period; and a high-traffic SKUs sub-catalog with products, in the retailer's catalog, which experience both higher-than-average web traffic and lower-than-average sales compared to other products in a same subcategory of products.

Example 14 includes the computerized method of any of Examples 8-13, wherein providing the indication comprises displaying: a 3-option status indicator that indicates whether at least one digital product catalog representation for a particular product, products in a catalog, or products in a sub-catalog fully, partially, or does not adhere to the at least one criterion; or a numeric score indicating whether at least one digital product catalog representation for a particular product, products in a catalog, or products in a sub-catalog fully, partially, or does not adhere to the at least one criterion.

Example 15 includes a non-transitory computer-readable storage medium comprising a set of instructions that, when executed by at least one processor, cause a machine to: receive data regarding a digital product catalog representation of a plurality of products from at least one data source at a computing system; generate a respective score for the digital product catalog representation for each respective product of the plurality of products, the score indicative of adherence of the digital product catalog representation for each respective product of the plurality of products to at least one criterion at the computing system; store the respective score for the digital product catalog representation for each respective product using at least one storage device; identify which products provide the greatest opportunity for sales improvement by improving adherence of the digital product catalog representation to the at least one criterion; and provide an indication of which products provide the greatest opportunity for sales improvement to at least one remotely located computing device from the computing system.

Example 16 includes the non-transitory computer-readable storage medium of Example 15, wherein the instructions, when executed by the at least one processor, further cause the machine to: provide a direct link to a system application to update the digital product catalog representation for a particular product to improve adherence of the digital product catalog representation to the at least one criterion.

Example 17 includes the non-transitory computer-readable storage medium of any of Examples 15-16, wherein the at least one criterion includes at least one of: attributes, images, product reviews, customer questions, videos, copy, augmented reality assets, assembly instructions, brand highlights, option breakout, demand planning, returns, rate, two day shipping coverage, fulfillment time, sourcing accuracy, replenishment, promotion participation, promotion automation, competitiveness, private label participation, backorder program participation, Supplier Oasis Fulfillment Services program participation, third-party billing program participation, returns program participation, or sponsored products.

Example 18 includes the non-transitory computer-readable storage medium of any of Examples 15-17, wherein the instructions, when executed by the at least one processor, further cause the machine to: provide the indication, which corresponds to a digital product catalog representation for a particular product, to the at least one remotely located computing device.

Example 19 includes the non-transitory computer-readable storage medium of any of Examples 15-18, wherein the instructions, when executed by the at least one processor, further cause the machine to: provide the indication, which corresponds to digital product catalog representations of products in a particular catalog, sub-catalog, or other grouping, to the at least one remotely located computing device.

Example 20 includes the non-transitory computer-readable storage medium of any of Examples 15-19, wherein the providing comprises displaying: a 3-option status indicator that indicates whether at least one digital product catalog representation for a particular product, products in a catalog, or products in a sub-catalog fully, partially, or does not adhere to the at least one criterion; or a numeric score indicating whether at least one digital product catalog representation for a particular product, products in a catalog, or products in a sub-catalog fully, partially, or does not adhere to the at least one criterion.

What is claimed is:

1. A computing system comprising:
   at least one processor;
   at least one memory communicatively coupled to the at least one processor;
   at least one storage device communicatively coupled to the at least one processor and configured to store data;
   at least one network interface communicatively coupled to the at least one processor and configured to communicate with at least one computerized data source and a plurality of remotely located computing devices;
   wherein the at least one network interface is configured to:
      receive data regarding a digital product catalog representation of a plurality of products for a plurality of product catalogs from the at least one computerized data source, wherein each corresponding product catalog of the plurality of product catalogs is for a corresponding retailer or manufacturer partner;
   wherein the at least one processor is configured to:
      store a respective product score for the digital product catalog representation for each respective product of the plurality of products for the plurality of product catalogs using the at least one storage device, each respective product score indicative of adherence of the digital product catalog representation for each respective product of the plurality of products to at least one criterion, wherein the at least one criterion includes at least one of: attributes, images, product reviews, customer questions, videos, copy, augmented reality assets, assembly instructions, brand highlights, option breakout, demand planning, returns, rate, two day shipping coverage, fulfillment time, sourcing accuracy, replenishment, promotion participation, promotion automation, competitiveness, private label participation, backorder program participation, fulfillment services program participation, third-party billing program participation, returns program participation, or sponsored products;
      identify a respective at least one low score product of the plurality of products for each respective product catalog of the plurality of product catalogs having at least one of (1) a lowest score or (2) a score below a predetermined threshold;
   wherein the at least one network interface is configured to communicate a respective indication of each respective at least one low score product for each respective product catalog to a respective remotely located computing device of the plurality of remotely located computing devices across at least one network, wherein each respective indication is presented to a respective user on the respective remotely located computing device using a respective graphical user interface, wherein the respective user provides input to engage a direct link in the respective graphical user interface associated with the respective indication of the respective at least one low score product for the respective product catalog to directly launch a system application to update at least a portion of the data regarding the digital product catalog representation for the respective at least one low score product stored in the at least one computerized data source to increase the respective product score of the respective at least one low score product;
wherein the at least one network interface is further configured to:
receive updated data regarding the digital product catalog representation for the respective at least one low score product from the at least one computerized data source; and
wherein the at least one processor is further configured to:
update the respective product score for the digital product catalog representation for the respective at least one low score product based on the updated data regarding the digital product catalog representation for the respective at least one low score product stored in the at least one computerized data source.

2. The computing system of claim 1, wherein each respective indication of each respective at least one low score product corresponds to a single particular digital product catalog representation for a particular product.

3. The computing system of claim 1, wherein each respective indication of each respective at least one low score product corresponds to respective digital product catalog representations for respective products in a particular catalog, sub-catalog, or other grouping.

4. The computing system of claim 3, wherein the sub-catalog is one of:
a selling SKUs sub-catalog with first products, in a retailer's catalog, which have been purchased on an online marketplace by any customer within a previous window of time;
a seasonal SKUs sub-catalog with second products, in the retailer's catalog, considered to be seasonal;
a new SKUs sub-catalog with third products, in the retailer's catalog, which have been for sale on the online marketplace for less than a predetermined time period; and
a high-traffic SKUs sub-catalog with fourth products, in the retailer's catalog, which experience both higher-than-average web traffic and lower-than-average sales compared to other products in a same subcategory of products.

5. The computing system of claim 1, wherein each respective indication of each respective at least one low score product includes a 3-option status indicator or a numeric score that indicates whether at least one digital product catalog representation for a particular product, products in a catalog, or products in a sub-catalog fully, partially, or does not adhere to the at least one criterion.

6. A computerized method comprising:
receiving, by at least one computer, data regarding a digital product catalog representation of a plurality of products for a plurality of product catalogs from at least one computerized data source at a computing system, wherein each corresponding product catalog of the plurality of product catalogs is for a corresponding retailer or manufacturer partner;
storing, by the at least one computer, a respective product score for the digital product catalog representation for each respective product of the plurality of products for the plurality of product catalogs using at least one storage device, each respective product score indicative of adherence of the digital product catalog representation for each respective product of the plurality of products to at least one criterion at the computing system, wherein the at least one criterion includes at least one of: attributes, images, product reviews, customer questions, videos, copy, augmented reality assets, assembly instructions, brand highlights, option breakout, demand planning, returns, rate, two day shipping coverage, fulfillment time, sourcing accuracy, replenishment, promotion participation, promotion automation, competitiveness, private label participation, backorder program participation, fulfillment services program participation, third-party billing program participation, returns program participation, or sponsored products;
identifying, by the at least one computer, a respective at least one low score product of the plurality of products for each respective product catalog of the plurality of product catalogs having at least one of (1) a lowest score or (2) a score below a predetermined threshold; and
communicating, by the at least one computer, a respective indication of each respective at least one low score product for each respective product catalog to a respective remotely located computing device of a plurality of remotely located computing devices from the computing system across at least one network;
presenting, by the at least one computer, each respective indication to a respective user on the respective remotely located computing device using a respective graphical user interface;
receiving, by the at least one computer, input within the respective graphical user interface from the respective user at the respective remotely located computing device, the input directly launching a system application;
receiving, by the at least one computer, input from the respective user in the system application to update at least a portion of the data regarding the digital product catalog representation for the respective at least one low score product stored in the at least one computerized data source to increase the respective product score of the respective at least one low score product;
receiving, by the at least one computer, updated data regarding the digital product catalog representation for the respective at least one low score product from the at least one computerized data source; and
updating, by the at least one computer, the respective product score for the digital product catalog representation for the respective at least one low score product based on the updated data regarding the digital product catalog representation for the respective at least one low score product stored in the at least one computerized data source.

7. The computerized method of claim 6, wherein each respective indication of each respective at least one low score product corresponds to a single respective digital product catalog representation for a particular product.

8. The computerized method of claim 6, wherein each respective indication of each respective at least one low score product corresponds to respective digital product catalog representations of respective products in a particular catalog, sub-catalog, or other grouping.

9. The computerized method of claim 8, wherein the sub-catalog is one of:
a selling SKUs sub-catalog with first products, in a retailer's catalog, which have been purchased on an online marketplace by any customer within a previous window of time;
a seasonal SKUs sub-catalog with second products, in the retailer's catalog, considered to be seasonal;

a new SKUs sub-catalog with third products, in the retailer's catalog, which have been for sale on the online marketplace for less than a predetermined time period; and a high-traffic SKUs sub-catalog with fourth products, in the retailer's catalog, which experience both higher-than-average web traffic and lower-than-average sales compared to other products in a same subcategory of products.

10. The computerized method of claim 6, wherein each respective indication of each respective at least one low score product includes a 3-option status indicator or a numeric score that indicates whether at least one digital product catalog representation for a particular product, products in a catalog, or products in a sub-catalog fully, partially, or does not adhere to the at least one criterion.

11. A non-transitory computer-readable storage medium comprising instructions that, when executed by at least one processor, cause a machine to:

receive data regarding a digital product catalog representation of a plurality of products for a plurality of product catalogs from at least one computerized data source at a computing system, wherein each corresponding product catalog of the plurality of product catalogs is for a corresponding retailer or manufacturer partner;

store a respective product score for the digital product catalog representation for each respective product of the plurality of products for the plurality of product catalogs using at least one storage device, each respective product score indicative of adherence of the digital product catalog representation for each respective product of the plurality of products to at least one criterion at the computing system, wherein the at least one criterion includes at least one of: attributes, images, product reviews, customer questions, videos, copy, augmented reality assets, assembly instructions, brand highlights, option breakout, demand planning, returns, rate, two day shipping coverage, fulfillment time, sourcing accuracy, replenishment, promotion participation, promotion automation, competitiveness, private label participation, backorder program participation, fulfillment services program participation, third-party billing program participation, returns program participation, or sponsored products;

identify a respective at least one low score product of the plurality of products for each respective product catalog of the plurality of product catalogs having at least one of (1) a lowest score or (2) a score below a predetermined threshold;

communicate a respective indication of each respective at least one low score product for each respective product catalog to a respective remotely located computing device of a plurality of remotely located computing devices from the computing system across at least one network, wherein each respective indication is presented to a respective user on the respective remotely located computing device using a respective graphical user interface, wherein the respective user provides input to engage a direct link in the respective graphical user interface associated with the respective indication of the respective at least one low score product for the respective product catalog to directly launch a system application to update at least a portion of the data regarding the digital product catalog representation for the respective at least one low score product stored in the at least one computerized data source to increase the respective product score of the respective at least one low score product;

receive updated data regarding the digital product catalog representation for the respective at least one low score product from the at least one computerized data source; and updating the respective product score for the digital product catalog representation for the respective at least one low score product based on the updated data regarding the digital product catalog representation for the respective at least one low score product stored in the at least one computerized data source.

12. The non-transitory computer-readable storage medium of claim 11, wherein each respective indication of each respective at least one low score product corresponds to a single respective digital product catalog representation for a particular product.

13. The non-transitory computer-readable storage medium of claim 11, wherein each respective indication of each respective at least one low score product corresponds to respective digital product catalog representations of respective products in a particular catalog, sub-catalog, or other grouping.

14. The non-transitory computer-readable storage medium of claim 11, wherein each respective indication of each respective at least one low score product includes a 3-option status indicator or a numeric score that indicates whether at least one digital product catalog representation for a particular product, products in a catalog, or products in a sub-catalog fully, partially, or does not adhere to the at least one criterion.

* * * * *